US012641613B2

(12) United States Patent
Myung et al.

(10) Patent No.: US 12,641,613 B2
(45) Date of Patent: May 26, 2026

(54) METHOD FOR TRANSMITTING AND RECEIVING UPLINK CONTROL CHANNEL AND DEVICE FOR SAME

(71) Applicant: LG Electronics Inc., Seoul (KR)

(72) Inventors: Sechang Myung, Seoul (KR); Suckchel Yang, Seoul (KR); Seonwook Kim, Seoul (KR); Seokmin Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 414 days.

(21) Appl. No.: 18/552,337

(22) PCT Filed: Apr. 1, 2022

(86) PCT No.: PCT/KR2022/004701
§ 371 (c)(1),
(2) Date: Sep. 25, 2023

(87) PCT Pub. No.: WO2022/215959
PCT Pub. Date: Oct. 13, 2022

(65) Prior Publication Data
US 2024/0064750 A1     Feb. 22, 2024

(30) Foreign Application Priority Data
Apr. 5, 2021     (KR) ........................ 10-2021-0043834

(51) Int. Cl.
*H04W 72/02*     (2009.01)
*H04W 72/21*     (2023.01)
(52) U.S. Cl.
CPC .................................. *H04W 72/21* (2023.01)
(58) Field of Classification Search
CPC . H04W 72/02; H04W 72/04; H04W 72/0446; H04W 72/21; H04W 72/23;
(Continued)

(56) References Cited

U.S. PATENT DOCUMENTS

2018/0084573 A1     3/2018   Jiang et al.
2019/0013908 A1     1/2019   Xiong et al.
(Continued)

FOREIGN PATENT DOCUMENTS

KR     10-2020-0118817     10/2020

OTHER PUBLICATIONS

International Search Report and Written Opinion in Appln. No. PCT/KR2022/004701, mailed on Jul. 19, 2022, 8 pages (with English translation).
(Continued)

*Primary Examiner* — Bo Hui A Zhu
(74) *Attorney, Agent, or Firm* — Fish & Richardson P.C.

(57) ABSTRACT

Disclosed is a method for a terminal to transmit a physical uplink control channel (PUCCH) in a wireless communication system. In particular, the method comprises the steps of: receiving information related to a PUCCH resource set of the PUCCH; determining, on the basis of the information, a PUCCH resource for transmitting the PUCCH by using frequency hopping; and transmitting the PUCCH by means of the PUCCH resource, wherein the PUCCH resource includes a first physical resource block (PRB) in a first hop and a second PRB in a second hop, and a first hopping distance, based on the information indicating the first PUCCH resource set, between the first PRB and the second PRB is equal to a second hopping distance, based on the information indicating a second PUCCH resource set, between the first PRB and the second PRB.

13 Claims, 20 Drawing Sheets

(58) Field of Classification Search
 CPC ..... H04W 72/50; H04W 72/51; H04W 72/52;
 H04W 72/53; H04W 72/54; H04W
 72/541; H04W 72/542; H04W 72/543;
 H04W 72/56
 See application file for complete search history.

(56) References Cited

U.S. PATENT DOCUMENTS

| | | | | |
|---|---|---|---|---|
| 2020/0178239 | A1* | 6/2020 | Yi ......................... | H04W 16/28 |
| 2021/0029731 | A1* | 1/2021 | Kundu ................ | H04W 74/004 |
| 2021/0051727 | A1* | 2/2021 | Lei ........................ | H04W 72/20 |

OTHER PUBLICATIONS

Qualcomm Incorporated, "Enhancements on Multi-TRP for PDCCH, PUCCH and PUSCH," 3GPP TSG-RAN WG1 Meeting #104-e, R1-2101447, e-Meeting, Jan. 25-Feb. 5, 2021, 28 pages.
Samsung, "Enhancements for PUCCH format 0/1/4 for NR from 52.6 GHz to 71 GHz," 3GPP TSG RAN WG1 #104-e, R1-2101196, e-Meeting, Jan. 25-Feb. 5, 2021, 3 pages.

* cited by examiner (a) Carrier aggregation between L-band and U-band (b) Standalone U-band(s)

RB assignment information for PUSCH: {Interlace #2, RB set #1} => Intersection of Interlace # and RB set #1

(a) Case 1: one SB index is indicated via RA information for PUSCH

RB assignment information for PUSCH: {Interlace #2, RB sets #1/#2} =>
=> Intersection of Interlace # and RB set #1/GB #2/RB set #1

(a) Case 2: consecutive SB index is indicated via RA information for PUSCH

Receiving information related to an index of initial PUCCH resource set — S1001

Receiving information related to PUCCH resource included in a PUCCH resource set corresponding to the index of initial PUCCH resource set — S1003

Determining PUCCH resources using frequency hopping — S1005

Transmitting PUCCH via the PUCCH resources — S1007

FIG. 13

| Initial CS index | 0 | 3 | 6 | 9 | --hopping → | 0 | 3 | 6 | 9 |
|---|---|---|---|---|---|---|---|---|---|
| High frequency RB | 8 | 9 | 10 | 11 | | 0 | 1 | 2 | 3 |
| | 12 | 13 | 14 | 15 | | 4 | 5 | 6 | 7 |
| | | | | | | | | | |
| ⋮ | | ⋮ | | | | ⋮ | | | |
| | | | | | | | | | |
| | 4 | 5 | 6 | 7 | | 12 | 13 | 14 | 15 |
| | 0 | 1 | 2 | 3 | | 8 | 9 | 10 | 11 |
| | Symbol #10 | | Symbol #11 | | | Symbol #12 | | Symbol #13 | |

Transmitting information related to OCC length of DMRS for PUCCH format 4 — S1601

Receiving PUCCH format 4 and DMRS — S1603

METHOD FOR TRANSMITTING AND RECEIVING UPLINK CONTROL CHANNEL AND DEVICE FOR SAME

CROSS-REFERENCE TO RELATED APPLICATIONS

This application is a National Stage application under 35 U.S.C. § 371 of International Application No. PCT/KR2022/004701, filed on Apr. 1, 2022, which claims the benefit of Korean Application No. 10-2021-0043834, filed on Apr. 5, 2021. The disclosures of the prior applications are incorporated by reference in their entirety.

TECHNICAL FIELD

The present disclosure relates to a method of transmitting and receiving an uplink control channel and a device therefor, and more particularly to a method of determining a physical uplink control channel (PUCCH) resource according to an initial PUCCH set using frequency hopping, a method of applying an orthogonal cover code (OCC) and a cyclic shift (CS) to a demodulation reference signal (DMRS) for a PUCCH, and a device therefor.

BACKGROUND

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

An object of the present disclosure is to provide a method of transmitting and receiving an uplink control channel and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

Provided is a method of transmitting a physical uplink control channel (PUCCH) by a user equipment (UE) in a wireless communication system. In particular, the method includes receiving information related to a PUCCH resource set of the PUCCH determining a PUCCH resource for transmitting the PUCCH using frequency hopping based on the information, and transmitting the PUCCH through the PUCCH resource, wherein the PUCCH resource includes a first physical resource block (PRB) in a first hop and a second PRB in a second hop, and a first hopping distance between the first PRB and the second PRB, based on the information indicating a first PUCCH resource set, is equal to a second hoping distance between the first PRB and the second PRB based on the information indicating a second PUCCH resource set.

In this case, the first PRB may have a lowest index among a plurality of PRBs for the PUCCH in the first hop, and the second PRB may have a lowest index or a highest index among a plurality of PRBs for the PUCCH in the second hop.

In the first hop, the PUCCH resource may be determined as many as PRBs for the PUCCH from the first PRB in a high frequency direction, and in the second hop, the PUCCH resource may be determined as many as the PRBs from the second PRB in a high frequency direction, or the PUCCH resource is determined as many as the PRBs from the second PRB in a low frequency direction.

An interval between a PRB with a highest index in the second hop and the second PRB based on the first PUCCH resource set may be a value obtained by multiplying a PRB offset value related to the second PUCCH resource set by a number of PRBs for the PUCCH.

The first hop may be a lower hop and the second hop may be an upper hop.

Total numbers of cyclic shift (CS) values corresponding to the first PUCCH resource set and the second PUCCH resource set may be equal to each other.

According to the present disclosure, a user equipment (UE) for transmitting a physical uplink control channel (PUCCH) in a wireless communication system includes at least one transceiver, at least one processor, and at least one computer memory operatively connected to the at least one processor and configured to store instructions that when executed causes the at least one processor to perform operations including receiving information related to a PUCCH resource set of the PUCCH through the at least one transceiver, determining a PUCCH resource for transmitting the PUCCH using frequency hopping based on the information, and transmitting the PUCCH through the PUCCH resource through the at least one transceiver, wherein the PUCCH resource includes a first physical resource block (PRB) in a first hop and a second PRB in a second hop, and wherein a first hopping distance between the first PRB and the second PRB, based on the information indicating a first PUCCH resource set, is equal to a second hoping distance between the first PRB and the second PRB based on the information indicating a second PUCCH resource set.

In this case, the first PRB may have a lowest index among a plurality of PRBs for the PUCCH in the first hop, and the second PRB may have a lowest index or a highest index among a plurality of PRBs for the PUCCH in the second hop.

In the first hop, the PUCCH resource may be determined as many as PRBs for the PUCCH from the first PRB in a high frequency direction, and in the second hop, the PUCCH resource may be determined as many as the PRBs from the second PRB in a high frequency direction, or the PUCCH resource is determined as many as the PRBs from the second PRB in a low frequency direction.

An interval between a PRB with a highest index in the second hop and the second PRB based on the first PUCCH resource set may be a value obtained by multiplying a PRB offset value related to the second PUCCH resource set by a number of PRBs for the PUCCH.

The first hop may be a lower hop and the second hop may be an upper hop.

Total numbers of cyclic shift (CS) values corresponding to the first PUCCH resource set and the second PUCCH resource set may be equal to each other.

According to the present disclosure, a device for transmitting a physical uplink control channel (PUCCH) in a wireless communication system includes at least one processor, and at least one computer memory operatively connected to the at least one processor and configured to store instructions that when executed causes the at least one processor to perform operations including receiving information related to a PUCCH resource set of the PUCCH, determining a PUCCH resource for transmitting the PUCCH using frequency hopping based on the information, and transmitting the PUCCH through the PUCCH resource, wherein the PUCCH resource includes a first physical resource block (PRB) in a first hop and a second PRB in a second hop, and a first hopping distance between the first PRB and the second PRB, based on the information indicating a first PUCCH resource set, is equal to a second hoping distance between the first PRB and the second PRB based on the information indicating a second PUCCH resource set.

The present disclosure provides a computer-readable storage medium including at least one computer program that causes at least one processor to perform operations, the operations including receiving information related to a PUCCH resource set of the PUCCH, determining a PUCCH resource for transmitting the PUCCH using frequency hopping based on the information, and transmitting the PUCCH through the PUCCH resource, wherein the PUCCH resource includes a first physical resource block (PRB) in a first hop and a second PRB in a second hop, and a first hopping distance between the first PRB and the second PRB, based on the information indicating a first PUCCH resource set, is equal to a second hoping distance between the first PRB and the second PRB based on the information indicating a second PUCCH resource set.

According to the present disclosure, a method of receiving a physical uplink control channel (PUCCH) by a base station (BS) in a wireless communication system includes transmitting information related to a PUCCH resource set of the PUCCH, and receiving the PUCCH through a PUCCH resource determined using frequency hopping, based on the information, wherein the PUCCH resource includes a first physical resource block (PRB) in a first hop and a second PRB in a second hop, and a first hopping distance between the first PRB and the second PRB, based on the information indicating a first PUCCH resource set, is equal to a second hoping distance between the first PRB and the second PRB based on the information indicating a second PUCCH resource set.

According to the present disclosure, a base station (BS) for receiving a physical uplink control channel (PUCCH) in a wireless communication system includes at least one transceiver, at least one processor, and at least one computer memory operatively connected to the at least one processor and configured to store instructions that when executed causes the at least one processor to perform operations including transmitting information related to a PUCCH resource set of the PUCCH through the at least one transceiver, receiving the PUCCH through a PUCCH resource determined using frequency hopping, based on the information through the at least one transceiver, wherein the PUCCH resource includes a first physical resource block (PRB) in a first hop and a second PRB in a second hop, and a first hopping distance between the first PRB and the second PRB, based on the information indicating a first PUCCH resource set, is equal to a second hoping distance between the first PRB and the second PRB based on the information indicating a second PUCCH resource set.

Advantageous Effects

According to the present disclosure, to support a new radio access technology (NR) system in a high frequency band of 52.6 GHz or higher, physical uplink control channel (PUCCH) transmission for acquiring efficient and proper coverage and frequency diversity gain may be performed by enhancing a resource allocation method of the existing PUCCH formats and a frequency hopping method for PUCCH resource allocation within an initial PUCCH resource set based on regulatory requirements such as the maximum output power limit and power spectral density (PSD).

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

FIG. 13 is a diagram for explaining an example in which a PUCCH resource is allocated using frequency hopping within an initial PUCCH resource set.

5

Figure 15:
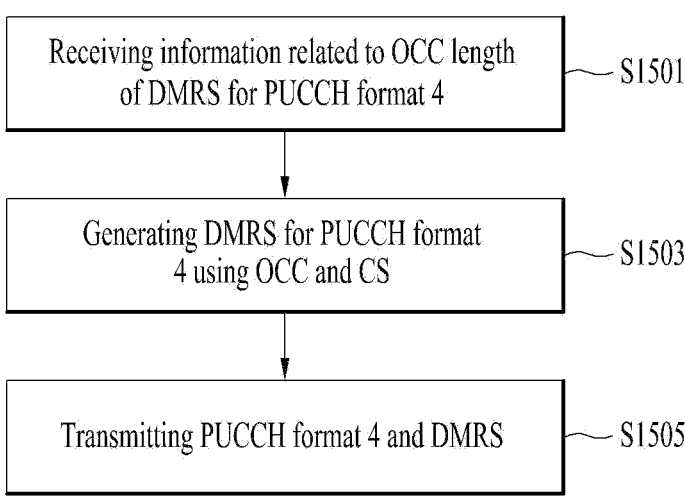
Figure 16:
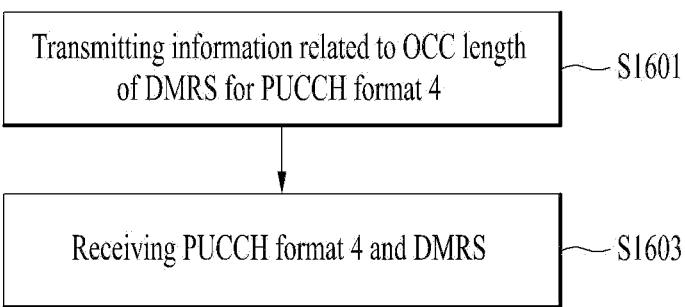
Figure 17:
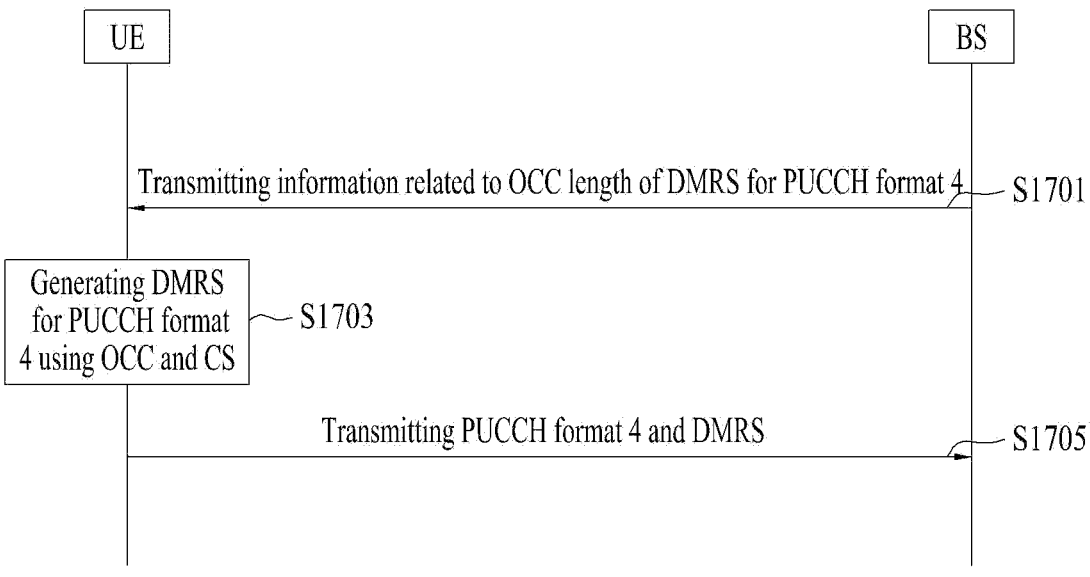

FIGS. 15 to 17 are diagrams for explaining an operation process of a UE and a BS according to another embodiment of the present disclosure.

Figure 18:
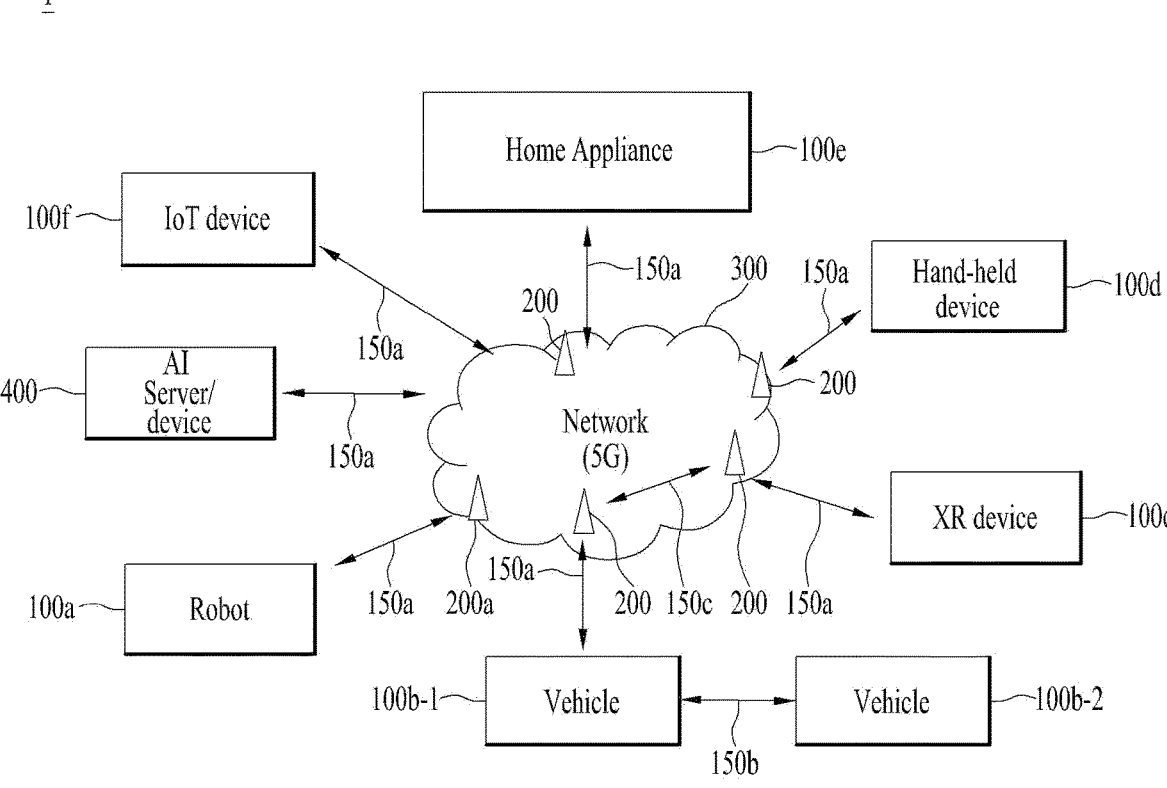

FIG. 18 illustrates a communication system applied to the present disclosure.

Figure 19:
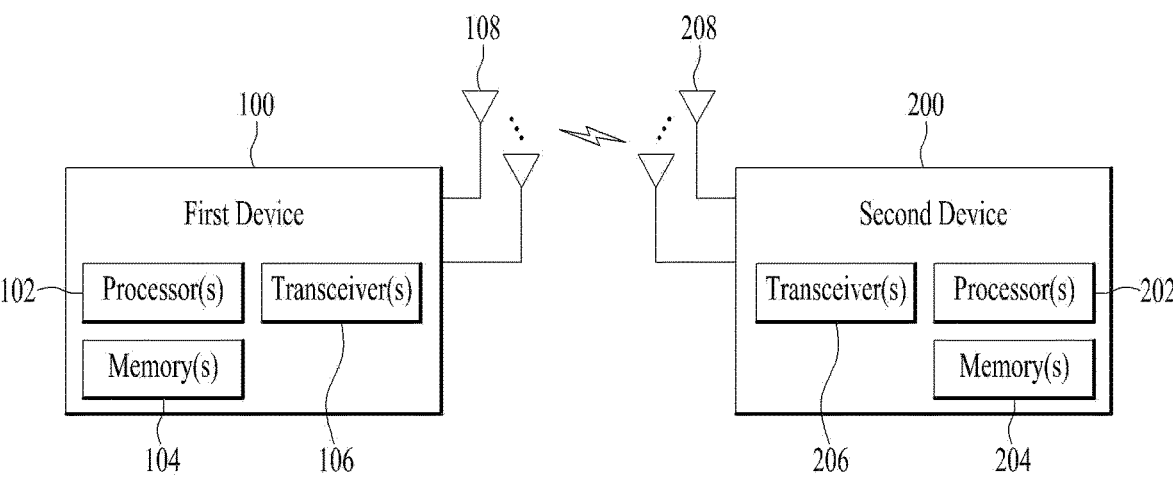

FIG. 19 illustrates wireless devices applicable to the present disclosure.

Figure 20:
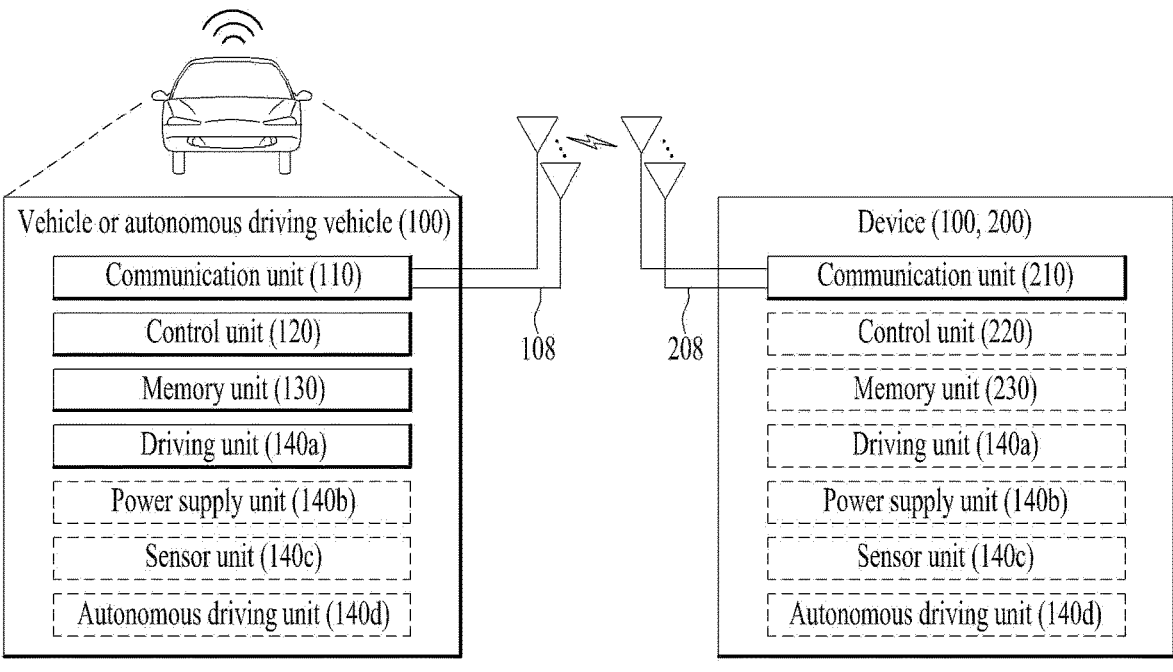

FIG. 20 illustrates a vehicle or an autonomous driving vehicle applied to the present disclosure.

BEST MODE

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

While the following description is given in the context of a 3GPP communication system (e.g., NR) for clarity, the technical spirit of the present disclosure is not limited to the 3GPP communication system. For the background art, terms, and abbreviations used in the present disclosure, refer to the technical specifications published before the present disclosure (e.g., 38.211, 38.212, 38.213, 38.214, 38.300, 38.331, and so on).

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup may be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

Figure 1:
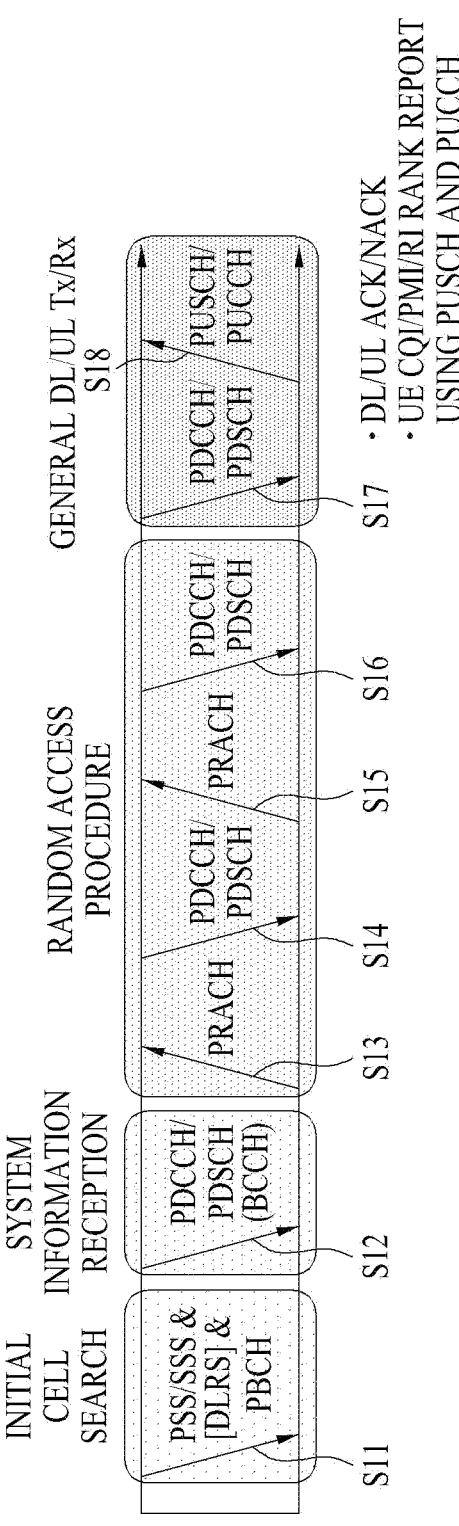
FIG. 1 illustrates physical channels and a general signal transmission method using the physical channels in a 3rd generation partnership project (3GPP) system as an example of a wireless communication system.

FIG. 1 illustrates physical channels and a general signal transmission method using the physical channels in a 3GPP system.

When a UE is powered on or enters a new cell, the UE performs initial cell search (S11). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

After the initial cell search, the UE may acquire more detailed system information by receiving a physical downlink control channel (PDCCH) and a physical downlink shared channel (PDSCH) corresponding to the PDCCH (S12).

Subsequently, to complete connection to the BS, the UE may perform a random access procedure with the BS (S13 to S16). Specifically, the UE may transmit a preamble on a physical random access channel (PRACH) (S13) and may receive a PDCCH and a random access response (RAR) for the preamble on a PDSCH corresponding to the PDCCH (S14). The UE may then transmit a physical uplink shared channel (PUSCH) by using scheduling information in the RAR (S15), and perform a contention resolution procedure including reception of a PDCCH and a PDSCH signal corresponding to the PDCCH (S16).

When the random access procedure is performed in two steps, steps S13 and S15 may be performed as one step (in which Message A is transmitted by the UE), and steps S14 and S16 may be performed as one step (in which Message B is transmitted by the BS).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

Figure 2:
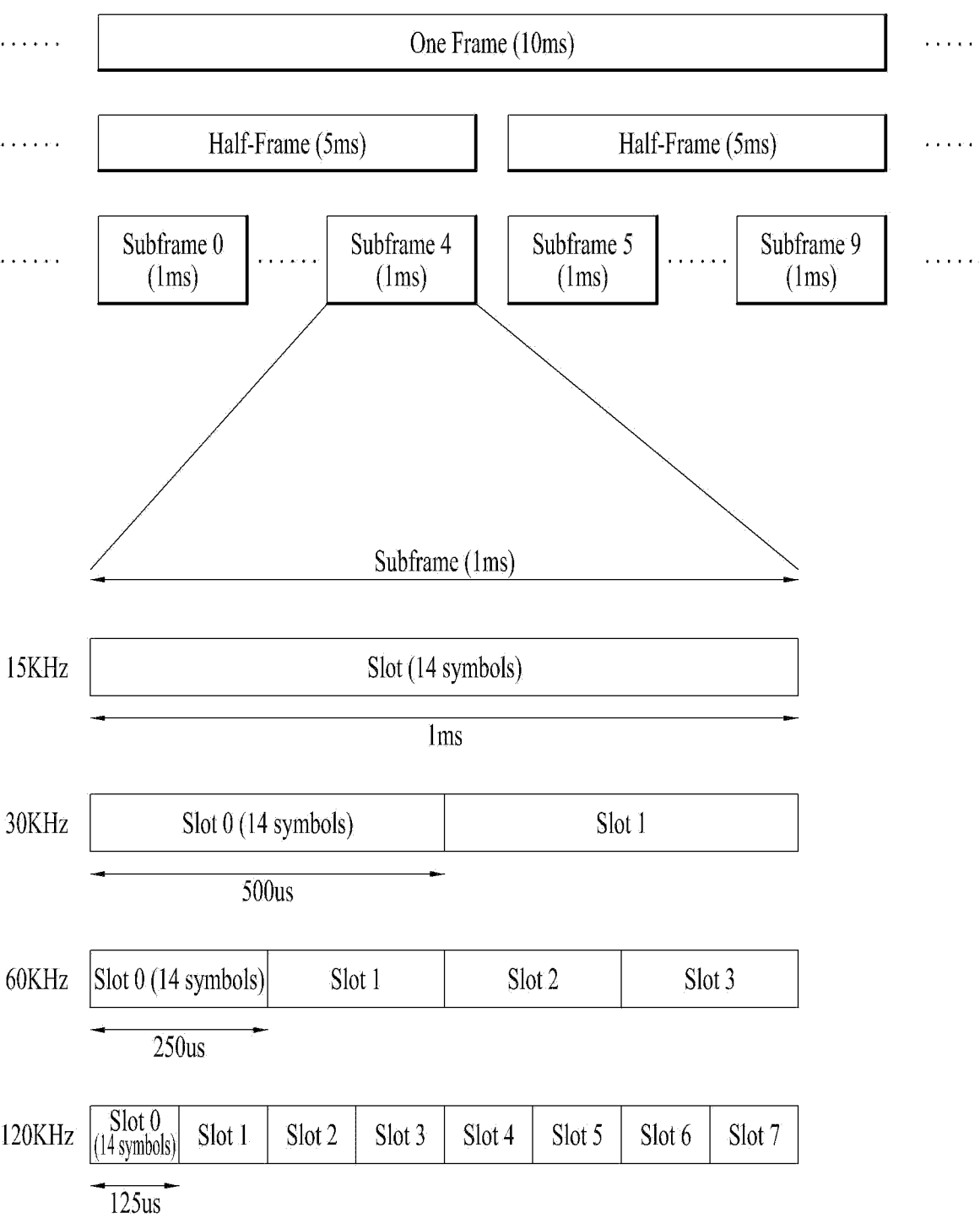
FIG. 2 illustrates a radio frame structure.

FIG. 2 illustrates a radio frame structure.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS $(15*2^u)$ | Nslotsymb | Nframe, uslot | Nsubframe, uslot |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |

TABLE 1-continued

| SCS (15*2^u) | Nslotsymb | Nframe, uslot | Nsubframe, uslot |
|---|---|---|---|
| 120 KHz (u = 3) | 14 | 80 | 8 |
| 240 KHz (u = 4) | 14 | 160 | 16 |

*$N^{slot}_{symb}$: number of symbols in a slot
*$N^{frame,u}_{slot}$: number of slots in a frame Table 2 illustrates that the number of symbols per slot, the number of slots per frame, and the number of slots per subframe vary according to SCSs in an extended CP case.

TABLE 2

| SCS (15*2^u) | Nslotsymb | Nframe, uslot | Nsubframe, uslot |
|---|---|---|---|
| 60 KHz (u = 2) | 12 | 40 | 4 |

The frame structure is merely an example, and the number of subframes, the number of slots, and the number of symbols in a frame may be changed in various manners. In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

In NR, various numerologies (or SCSs) may be supported to support various 5$^{th}$ generation (5G) services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. FR1 and FR2 may be configured as described in Table 3 below. FR2 may be millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 3:
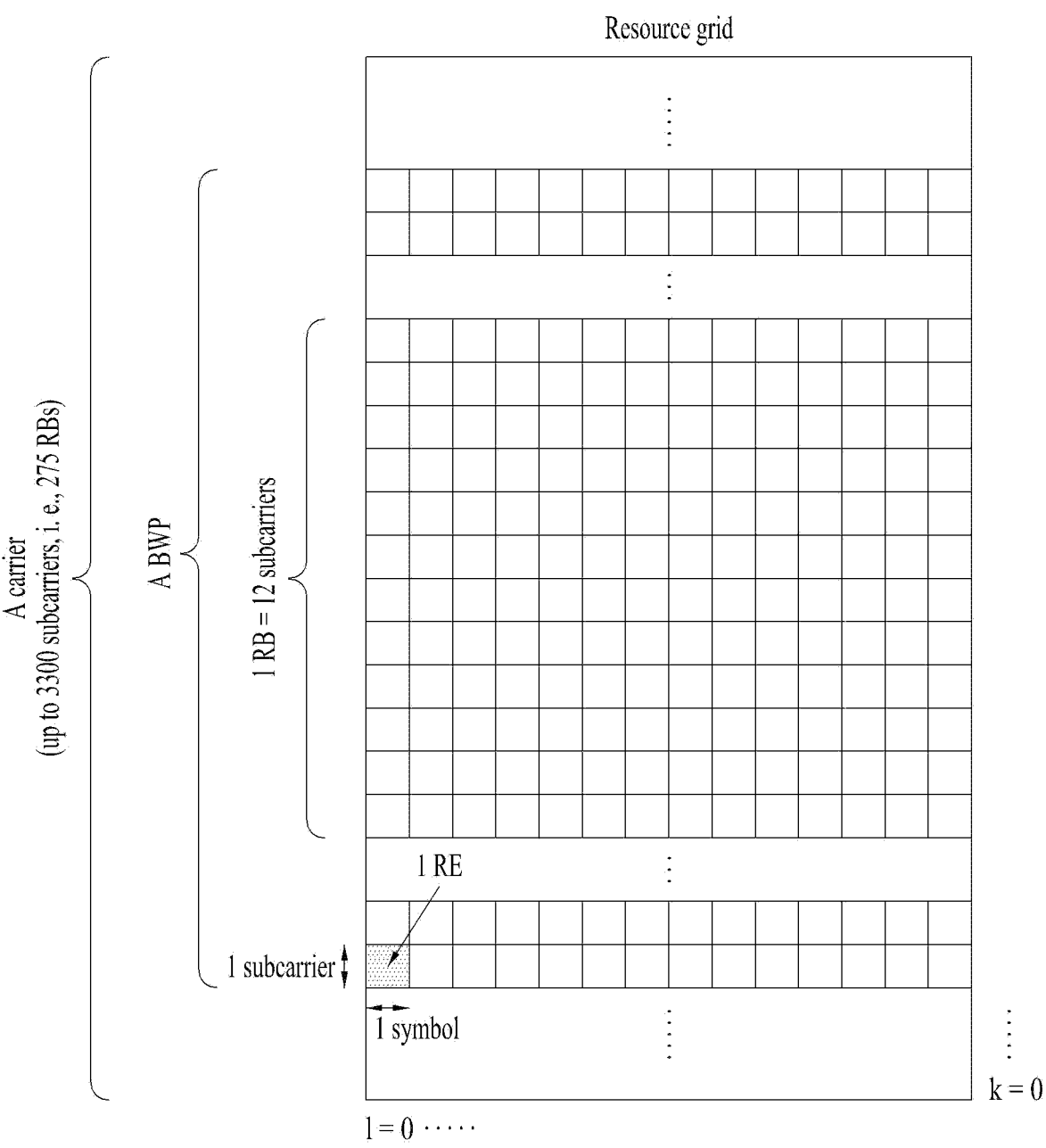
FIG. 3 illustrates a resource grid of a slot.

FIG. 3 illustrates a resource grid during the duration of one slot. A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid m is referred to as a resource element (RE) and one complex symbol may be mapped to each RE.

Similarly to licensed-assisted access (LAA) in the legacy 3GPP LTE system, use of an unlicensed band for cellular communication is also under consideration in a 3GPP NR system. Unlike LAA, a stand-along (SA) operation is aimed in an NR cell of an unlicensed band (hereinafter, referred to as NR unlicensed cell (UCell)). For example, PUCCH, PUSCH, and PRACH transmissions may be supported in the NR UCell.

On LAA UL, with the introduction of an asynchronous HARQ procedure, there is no additional channel such as a physical HARQ indicator channel (PHICH) for indicating HARQ-ACK information for a PUSCH to the UE. Therefore, accurate HARQ-ACK information may not be used to adjust a contention window (CW) size in a UL LBT procedure. In the UL LBT procedure, when a UL grant is received in the n-th subframe, the first subframe of the most recent UL transmission burst prior to the (n−3)-th subframe has been configured as a reference subframe, and the CW size has been adjusted based on a new data indicator (NDI) for a HARQ process ID corresponding to the reference subframe. That is, when the BS toggles NDIs per one or more transport blocks (TBs) or instructs that one or more TBs be retransmitted, a method has been introduced of increasing the CW size to the next largest CW size of a currently applied CW size in a set for pre-agreed CW sizes under the assumption that transmission of a PUSCH has failed in the reference subframe due to collision with other signals or initializing the CW size to a minimum value (e.g., CWmin) under the assumption that the PUSCH in the reference subframe has been successfully transmitted without any collision with other signals.

Figure 4:
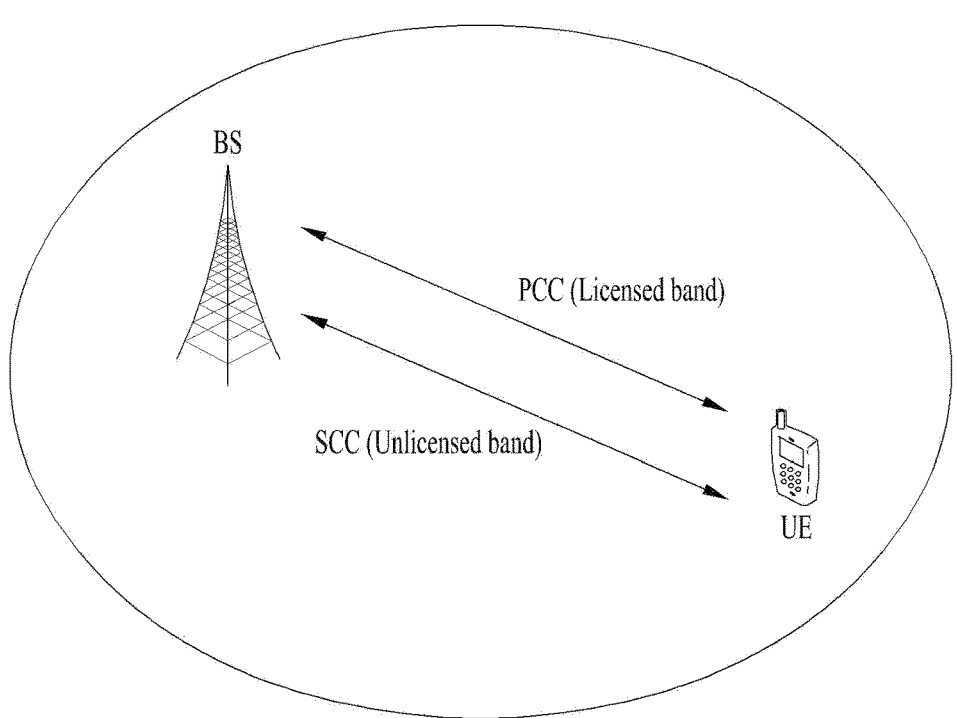
FIG. 4 illustrates an exemplary wireless communication system supporting an unlicensed band applicable to the present disclosure.
Figure 4:
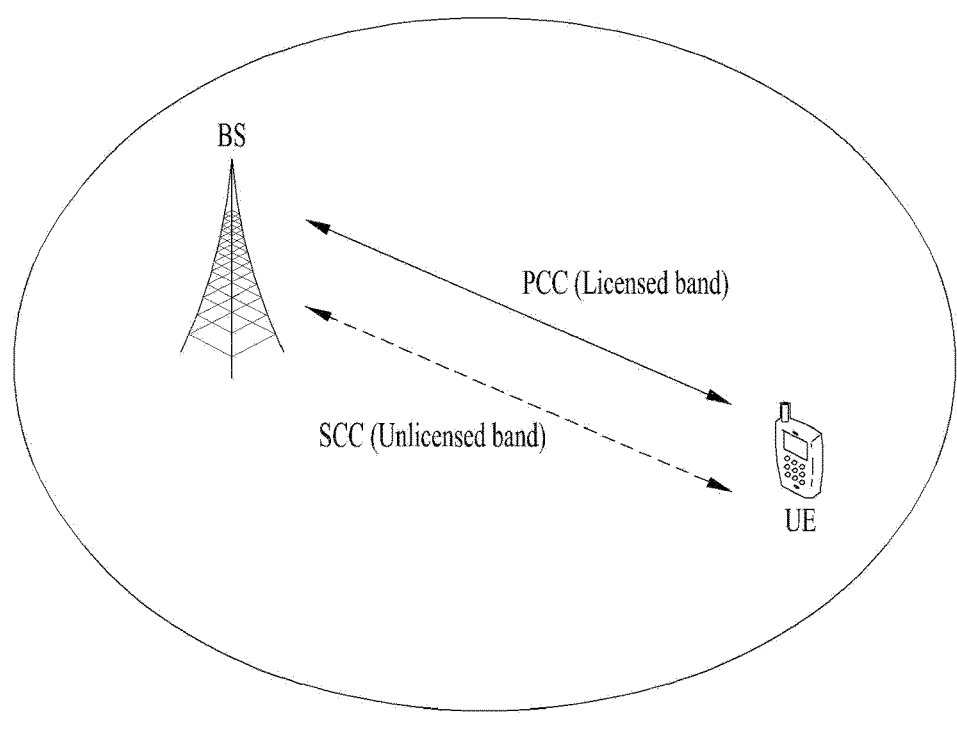

FIG. 4 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on carrier-aggregated LCC and UCC as illustrated in FIG. 4(a), the LCC and the UCC may be configured as a primary CC (PCC) and a secondary CC (SCC), respectively. The BS and the UE may transmit and receive signals on one UCC or on a plurality of carrier-aggregated UCCs as illustrated in FIG. 7(b). In other words, the BS and UE may transmit and receive signals only on UCC(s) without using any LCC. For an SA operation, PRACH, PUCCH, PUSCH, and SRS transmissions may be supported on a UCell.

Signal transmission and reception operations in a U-band as described in the present disclosure may be applied to the afore-mentioned deployment scenarios (unless specified otherwise).

Unless otherwise noted, the definitions below are applicable to the following terminologies used in the present disclosure.

Channel: a carrier or a part of a carrier composed of a contiguous set of RBs in which a channel access procedure (CAP) is performed in a shared spectrum.

Channel access procedure (CAP): a procedure of assessing channel availability based on sensing before signal transmission in order to determine whether other communication node(s) are using a channel. A basic sensing unit is a sensing slot with a duration of Tsl=9 μs. The BS or the UE senses the slot during a sensing slot duration. When power detected for at least 4 us within the sensing slot duration is less than an energy detection threshold Xthresh, the sensing slot duration Tsl is be considered to be idle. Otherwise, the sensing slot duration Tsl is considered to be busy. CAP may also be called listen before talk (LBT).

Channel occupancy: transmission(s) on channel(s) from the BS/UE after a CAP.

Channel occupancy time (COT): a total time during which the BS/UE and any BS/UE(s) sharing channel occupancy performs transmission(s) on a channel after a CAP. Regarding COT determination, if a transmission gap is less than or equal to 25 μs, the gap duration may be counted in a COT.

The COT may be shared for transmission between the BS and corresponding UE(s).

Specifically, sharing a UE-initiated COT with the BS may mean an operation in which the UE assigns a part of occupied channels through random backoff-based LBT (e.g., Category 3 (Cat-3) LBT or Category 4 (Cat-4) LBT) to the BS and the BS performs DL transmission using a remaining COT of the UE, when it is confirmed that a channel is idle by success of LBT after performing LBT without random backoff (e.g., Category 1 (Cat-1) LBT or Category 2 (Cat-2) LBT) using a timing gap occurring before DL transmission start from a UL transmission end timing of the UE.

Meanwhile, sharing a gNB-initiated COT with the UE may mean an operation in which the BS assigns a part of occupied channels through random backoff-based LBT (e.g., Cat-3 LBT or Cat-4 LBT) to the UE and the UE performs UL transmission using a remaining COT of the BS, when it is confirmed that a channel is idle by success of LBT after performing LBT without random backoff (e.g., Cat-1 LBT or Cat-2 LBT) using a timing gap occurring before UL transmission start from a DL transmission end timing of the BS.

DL transmission burst: a set of transmissions without any gap greater than 16 μs from the BS. Transmissions from the BS, which are separated by a gap exceeding 16 μs are considered as separate DL transmission bursts. The BS may perform transmission(s) after a gap without sensing channel availability within a DL transmission burst.

UL transmission burst: a set of transmissions without any gap greater than 16 μs from the UE. Transmissions from the UE, which are separated by a gap exceeding 16 μs are considered as separate UL transmission bursts. The UE may perform transmission(s) after a gap without sensing channel availability within a DL transmission burst.

Discovery burst: a DL transmission burst including a set of signal(s) and/or channel(s) confined within a window and associated with a duty cycle. The discovery burst may include transmission(s) initiated by the BS, which includes a PSS, an SSS, and a cell-specific RS (CRS) and further includes a non-zero power CSI-RS. In the NR system, the discover burst includes may include transmission(s) initiated by the BS, which includes at least an SS/PBCH block and further includes a CORESET for a PDCCH scheduling a PDSCH carrying SIB1, the PDSCH carrying SIB1, and/or a non-zero power CSI-RS.

Figure 5:
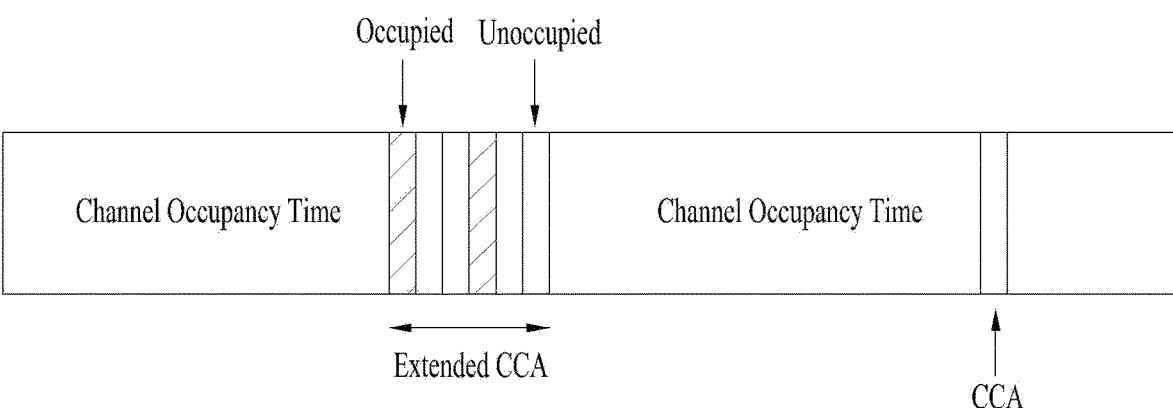
FIG. 5 illustrates an exemplary method of occupying resources in an unlicensed band applicable to the present disclosure.

FIG. 5 illustrates an exemplary method of occupying resources in a U-band.

Referring to FIG. 5, a communication node (e.g., a BS or a UE) operating in a U-band should determine whether other communication node(s) is using a channel, before signal transmission. For this purpose, the communication node may perform a CAP to access channel(s) on which transmission(s) is to be performed in the U-band. The CAP may be performed based on sensing. For example, the communication node may determine whether other communication node(s) is transmitting a signal on the channel(s) by carrier sensing (CS) before signal transmission. Determining that other communication node(s) is not transmitting a signal is defined as confirmation of clear channel assessment (CCA). In the presence of a CCA threshold (e.g., Xthresh) which has been predefined or configured by higher-layer (e.g., RRC) signaling, the communication node may determine that the channel is busy, when detecting energy higher than the CCA threshold in the channel. Otherwise, the communication node may determine that the channel is idle. When determining that the channel is idle, the communication node may start to transmit a signal in the U-band. CAP may be replaced with LBT.

Table 4 describes an exemplary CAP supported in NR-U.

TABLE 4

| | Type | Explanation |
|---|---|---|
| L | Type 1 CAP | CAP with random back-off time duration spanned by the sensing slots that are sensed to be idle before a downlink transmission(s) is random |
| | Type 2 CAP Type 2A, 2B, 2C | CAP without random back-off time duration spanned by sensing slots that are sensed to be idle before a downlink transmission(s) is deterministic |
| L | Type 1 CAP | CAP with random back-off time duration spanned by the sensing slots that are sensed to be idle before a downlink transmission(s) is random |
| | Type 2 CAP Type 2A, 2B, 2C | CAP without random back-off time duration spanned by sensing slots that are sensed to be idle before a downlink transmission(s) is deterministic |

In a wireless communication system supporting a U-band, one cell (or carrier (e.g., CC)) or BWP configured for a UE may be a wideband having a larger bandwidth (BW) than in legacy LTE. However, a BW requiring CCA based on an independent LBT operation may be limited according to regulations. Let a subband (SB) in which LBT is individually performed be defined as an LBT-SB. Then, a plurality of LBT-SBs may be included in one wideband cell/BWP. A set of RBs included in an LBT-SB may be configured by higher-layer (e.g., RRC) signaling. Accordingly, one or more LBT-SBs may be included in one cell/BWP based on (i) the BW of the cell/BWP and (ii) RB set allocation information. A plurality of LBT-SBs may be included in the BWP of a cell (or carrier). An LBT-SB may be, for example, a 20-MHz band. The LBT-SB may include a plurality of contiguous (P)RBs in the frequency domain, and thus may be referred to as a (P)RB set.

A UE performs a Type 1 or Type 2 CAP for a UL signal transmission in a U-band. In general, the UE may perform a CAP (e.g., Type 1 or Type 2) configured by a BS, for a UL signal transmission. For example, CAP type indication information may be included in a UL grant (e.g., DCI format 0_0 or DCI format 0_1) that schedules a PUSCH transmission.

In the Type 1 UL CAP, the length of a time period spanned by sensing slots sensed as idle before transmission(s) is random. The Type 1 UL CAP may be applied to the following transmissions.

PUSCH/SRS transmission(s) scheduled and/or configured by BS

PUCCH transmission(s) scheduled and/or configured by BS

Transmission(s) related to random access procedure (RAP)

Figure 6:
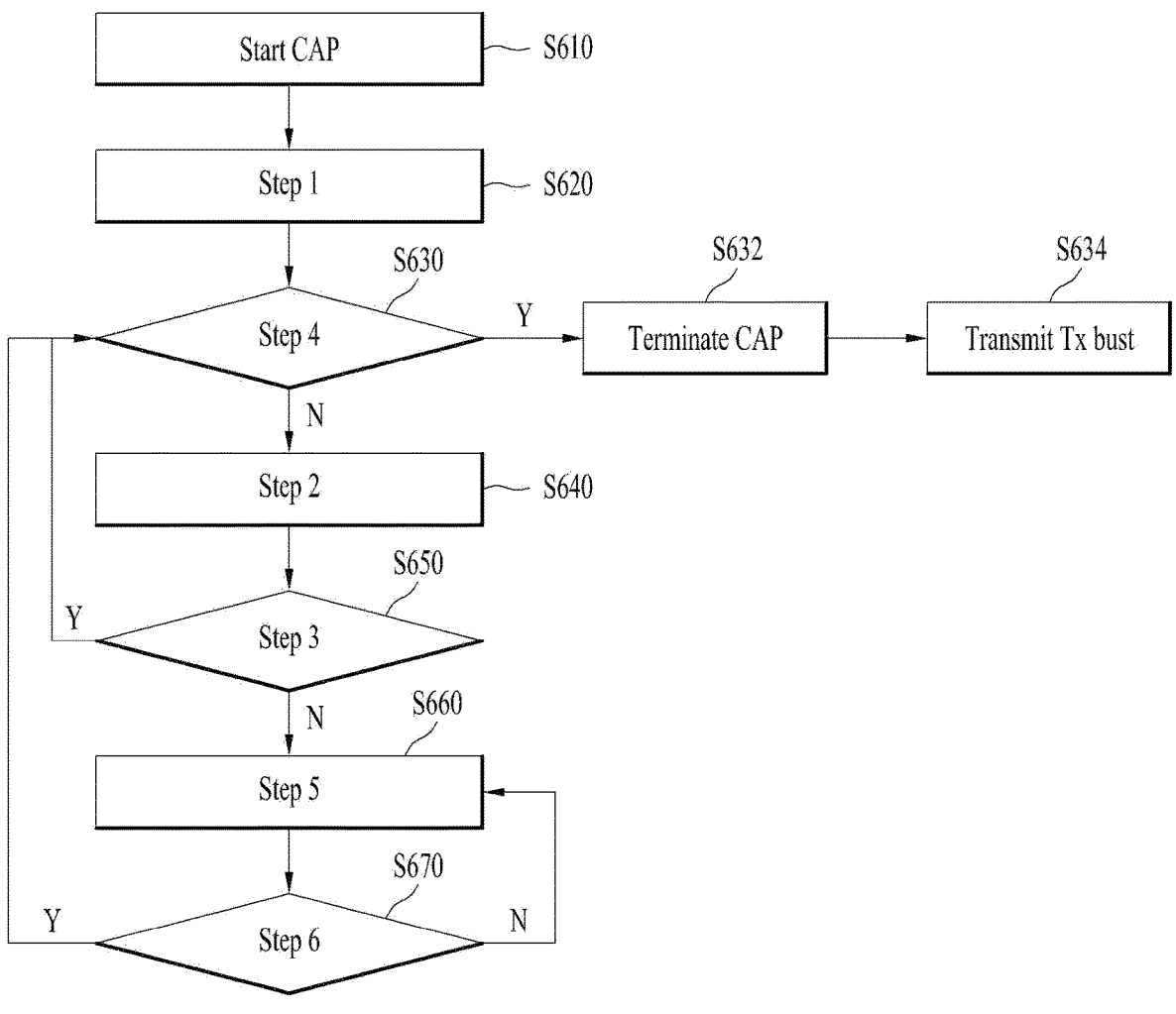
FIG. 6 illustrates an example of a channel access procedure of a user equipment (UE) for uplink signal transmission in an unlicensed band applicable to the present disclosure.

FIG. 6 illustrates Type 1 CAP among channel access procedures of a UE for UL signal transmission in a U-band applicable to the present disclosure.

First, UL signal transmission in the U-band will be described with reference to FIG. 6.

The UE may sense whether a channel is idle for a sensing slot duration in a defer duration Td. After a counter N is decremented to 0, the UE may perform a transmission (S334). The counter N is adjusted by sensing the channel for additional slot duration(s) according to the following procedure.

Step 1) Set N=Ninit where Ninit is a random number uniformly distributed between 0 and CWp, and go to step 4 (S320).

Step 2) If N>0 and the UE chooses to decrement the counter, set N=N−1 (S340).

Step 3) Sense the channel for an additional slot duration, and if the additional slot duration is idle (Y), go to step 4. Else (N), go to step 5 (S350).

Step 4) If N=0 (Y) (S330), stop CAP (S332). Else (N), go to step 2.

Step 5) Sense the channel until a busy sensing slot is detected within the additional defer duration Td or all slots of the additional defer duration Td are sensed as idle (S360).

Step 6) If the channel is sensed as idle for all slot durations of the additional defer duration Td (Y), go to step 4. Else (N), go to step 5 (S370).

Table 5 illustrates that mp, a minimum CW, a maximum CW, a maximum channel occupancy time (MCOT), and an allowed CW size applied to a CAP vary according to channel access priority classes.

TABLE 5

| Channel Access Priority Class (p) | mp | CWmin, p | CWmax, p | Tulmcot, p | allowed CWp sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

The defer duration Td includes a duration Tf (16 μs) immediately followed by mp consecutive slot durations where each slot duration Tsl is 9 μs, and Tf includes a sensing slot duration Tsl at the start of the 16-μs duration. CWWmin,p<=CWp<=CWmax,p. CWp is set to CWmin,p, and may be updated before Step 1 based on an explicit/implicit reception response to a previous UL burst (e.g., PUSCH) (CW size update). For example, CWp may be initialized to CWmin,p based on an explicit/implicit reception response to the previous UL burst, may be increased to the next higher allowed value, or may be maintained to be an existing value.

In the Type 2 UL CAP, the length of a time period spanned by sensing slots sensed as idle before transmission(s) is deterministic. Type 2 UL CAPs are classified into Type 2A UL CAP, Type 2B UL CAP, and Type 2C UL CAP. In the Type 2A UL CAP, the UE may transmit a signal immediately after the channel is sensed as idle during at least a sensing duration Tshort_dl (=25 μs). Tshort_dl includes a duration Tf (=16 μs) and one immediately following sensing slot duration. In the Type 2A UL CAP, Tf includes a sensing slot at the start of the duration. In the Type 2B UL CAP, the UE may transmit a signal immediately after the channel is sensed as idle during a sensing slot duration Tf (=16 μs). In the Type 2B UL CAP, Tf includes a sensing slot within the last 9 μs of the duration. In the Type 2C UL CAP, the UE does not sense a channel before a transmission.

To allow the UE to transmit UL data in the U-band, the BS should succeed in an LBT operation to transmit a UL grant in the U-band, and the UE should also succeed in an LBT operation to transmit the UL data. That is, only when both of the BS and the UE succeed in their LBT operations, the UE may attempt the UL data transmission. Further, because a delay of at least 4 msec is involved between a UL grant and scheduled UL data in the LTE system, earlier access from another transmission node coexisting in the U-band during the time period may defer the scheduled UL data transmission of the UE. In this context, a method of increasing the efficiency of UL data transmission in the U-band is under discussion.

To support a UL transmission having a relatively high reliability and a relatively low time delay, NR also supports CG type 1 and CG type 2 in which the BS preconfigures time, frequency, and code resources for the UE by higher-layer signaling (e.g., RRC signaling) or both of higher-layer signaling and L1 signaling (e.g., DCI). Without receiving a UL grant from the BS, the UE may perform a UL transmission in resources configured with type 1 or type 2. In type 1, the periodicity of a CG, an offset from SFN=0, time/frequency resource allocation, a repetition number, a DMRS parameter, an MCS/TB size (TBS), a power control parameter, and so on are all configured only by higher-layer signaling such as RRC signaling, without L1 signaling. Type 2 is a scheme of configuring the periodicity of a CG and a power control parameter by higher-layer signaling such as RRC signaling and indicating information about the remaining resources (e.g., the offset of an initial transmission timing, time/frequency resource allocation, a DMRS parameter, and an MCS/TBS) by activation DCI as L1 signaling.

A largest difference between the AUL of the LTE LAA and the configured grant of the NR is a method of transmitting HARQ-ACK feedback for the PUSCH transmitted by the UE without a UL grant and presence or absence of UCI transmitted together when the PUSCH is transmitted. In the NR Configured grant, the HARQ process is determined using an equation of a symbol index, a period, and the number of HARQ processes, but in the LTE LAA, explicit HARQ-ACK feedback information is transmitted through AUL-downlink feedback information (DFI). In the LTE LAA, whenever the AUL PUSCH is transmitted, UCI containing information such as HARQ ID, NDI, or RV is also transmitted through the AUL-UCI. In the NR configured grant, the UE is identified by the time/frequency resources and DMRS resources used by the UE for PUSCH transmission, and in the LTE LAA, the UE is identified by the UE ID explicitly included in the AUL-UCI transmitted along with the PUSCH in addition to the DMRS resources.

Figure 7:
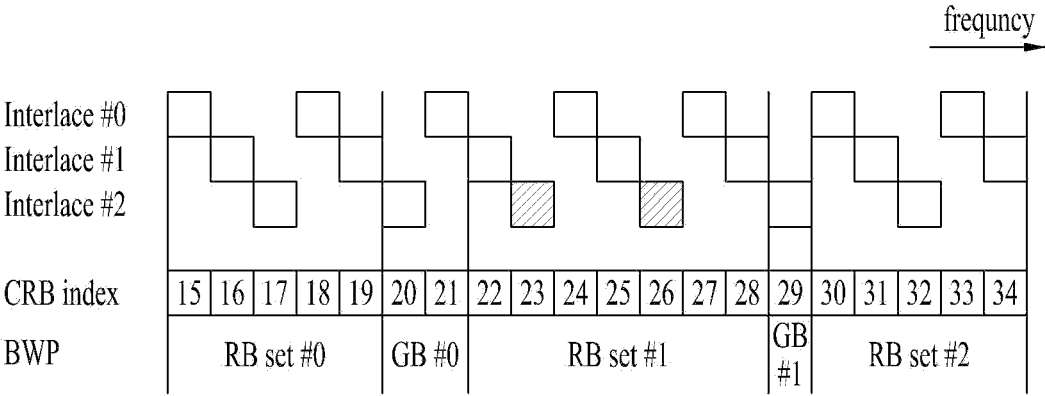
FIG. 7 is a diagram for explaining a resource allocation method for uplink transmission in a shared spectrum applicable to the present disclosure.
Figure 7:
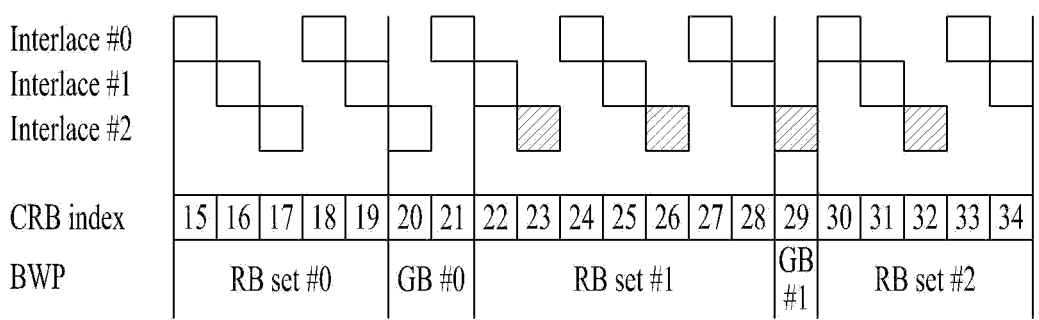

FIG. 7 illustrates resource assignment for UL transmission in a shared spectrum.

Referring to FIG. 7(*a*), RBs belonging to interlace #1 in RB set #1 may be determined as a PUSCH resource based on resource assignment information for a PUSCH indicating {interlace #1, RB set #1}. That is, RBs corresponding to the intersection of {interlace #1, RB set #1} may be determined as the PUSCH resource. Referring to FIG. 4(*b*), RBs belonging to interlace #2 in RB sets #1 and #2 may be determined as the PUSCH resource based on the resource assignment information for the PUSCH indicating {interlace #2, RB sets #1 and #2}. In this case, a guide band (GB) (i.e., GB #1) between RB set #1 and RB set #2 may also be used as the PUSCH transmission resource. That is, RBs corresponding to the intersection of {interlace #1, RB sets #1 and #2, GB #1} may be determined as the PUSCH resource. In this case, a GB (i.e., GB #0) which is not between RB set #1 and RB set #2 is not used as the PUSCH transmission resource even if the GB is adjacent to RB sets #1 and #2.

Figure 8:
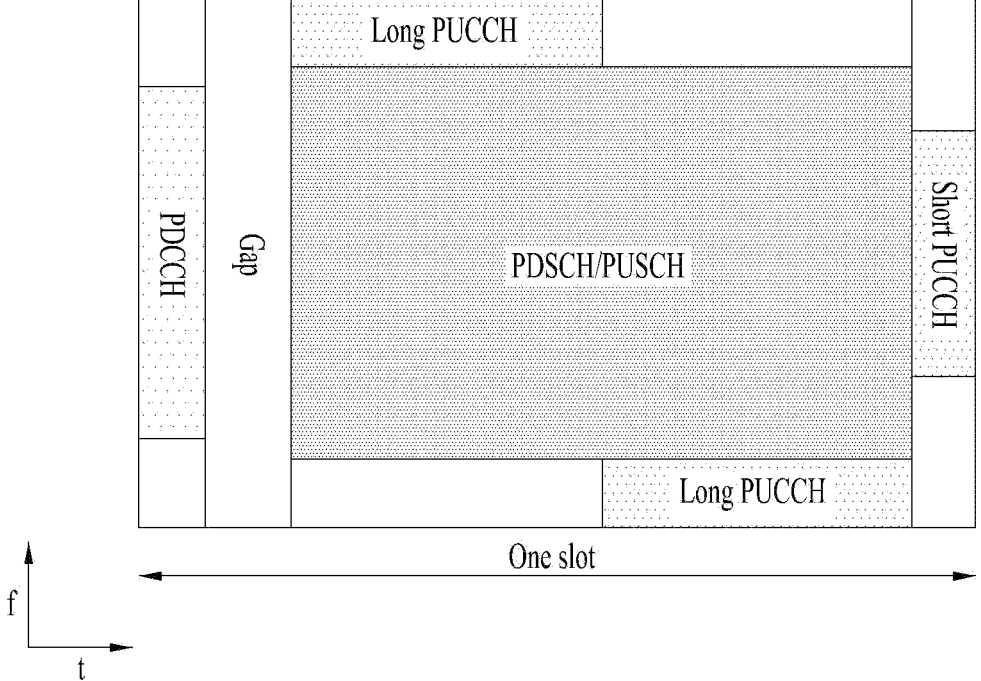
FIG. 8 illustrates exemplary mapping of physical channels in a slot.

FIG. 8 illustrates exemplary mapping of physical channels in a slot.

A DL control channel, DL or UL data, and a UL control channel may all be included in one slot. For example, the first N symbols (hereinafter, referred to as a DL control region) in a slot may be used to transmit a DL control channel, and the last M symbols (hereinafter, referred to as a UL control region) in the slot may be used to transmit a UL control channel. N and M are integers equal to or greater than 0. A resource region (hereinafter, referred to as a data region) between the DL control region and the UL control region may be used for DL data transmission or UL data transmission. A time gap for DL-to-UL or UL-to-DL switching may be defined between a control region and the data region. A PDCCH may be transmitted in the DL control region, and a PDSCH may be transmitted in the DL data region. Some symbols at the time of switching from DL to UL in a slot may be configured as the time gap.

UL Channel Structures

A UE transmits a related signal to the BS on a UL channel, which will be described later, and the BS receives the related signal from the UE through the UL channel to be described later.

(1) Physical Uplink Control Channel (PUCCH)

The PUCCH carries UCI, HARQ-ACK and/or scheduling request (SR), and is divided into a short PUCCH and a long PUCCH according to the PUCCH transmission length.

The UCI includes the following information.

SR: information used to request UL-SCH resources.

HARQ-ACK: a response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.

CSI: feedback information for a DL channel. Multiple input multiple output (MIMO)-related feedback information includes an RI and a PMI.

Table 6 illustrates exemplary PUCCH formats. PUCCH formats may be divided into short PUCCHs (Formats 0 and 2) and long PUCCHs (Formats 1, 3, and 4) based on PUCCH transmission durations.

TABLE 6

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |

16

TABLE 6-continued

| PUCCH format | Length in OFDM symbols $N_{symb}^{PUCCH}$ | Number of bits | Usage | Etc |
|---|---|---|---|---|
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration. PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBs, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC.

Modulation symbols are transmitted in TDM with the DMRS.

(2) Physical Uplink Shared Channel (PUSCH)

The PUSCH carries UL data (e.g., UL-shared channel transport block (UL-SCH TB)) and/or UL control information (UCI), and is transmitted based a Cyclic Prefix-Orthogonal Frequency Division Multiplexing (CP-OFDM) waveform or a Discrete Fourier Transform-spread-Orthogonal Frequency Division Multiplexing (DFT-s-OFDM) waveform. When the PUSCH is transmitted based on the DFT-s-OFDM waveform, the UE transmits the PUSCH by applying transform precoding. For example, when transform precoding is not allowed (e.g., transform precoding is disabled), the UE may transmit the PUSCH based on the CP-OFDM waveform. When transform precoding is allowed (e.g., transform precoding is enabled), the UE may transmit the PUSCH based on the CP-OFDM waveform or the DFT-s-OFDM waveform. PUSCH transmission may be dynamically scheduled by the UL grant in the DCI or may be semi-statically scheduled based on higher layer (e.g., RRC) signaling (and/or Layer 1 (L1) signaling (e.g., PDCCH)) (configured grant). PUSCH transmission may be performed on a codebook basis or a non-codebook basis.

Figure 9:
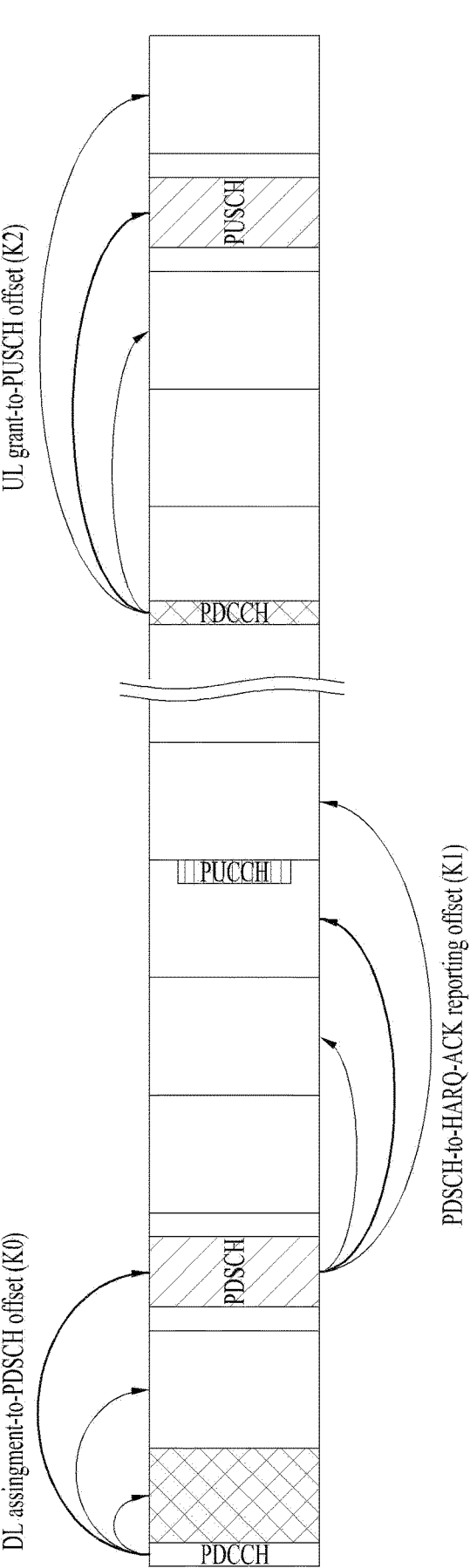
FIG. 9 illustrates a physical uplink control channel (PUCCH) and physical uplink shared channel (PUSCH) transmission procedure.

FIG. 9 is a diagram for explaining a HARQ transmission timing, and a PUSCH transmission timing and assignment method.

HARQ-ACK is information indicating whether the UE has successfully received a physical DL channel. Upon successfully receiving the physical DL channel, the UE feeds back ACK to the BS and, otherwise, the UE feeds back NACK to the BS. In NR, HARQ supports 1-bit HARQ-ACK feedback per transport block. FIG. 5 illustrates an example of a HARQ-ACK timing K1.

In FIG. 9, K0 represents the number of slots from a slot with a PDCCH carrying DL assignment (i.e., DL grant) to a slot with corresponding PDSCH transmission, K1 represents the number of slots from a slot with a PDSCH to a slot with corresponding HARQ-ACK transmission, and K2 represents the number of slots from a slot with a PDCCH carrying a UL grant to a slot with corresponding PUSCH transmission. That is, K0, K1, and K2 may be briefly summarized as listed Table 7 below.

TABLE 7

|  | A | B |
|---|---|---|
| K0 | DL scheduling DCI | Corresponding DL data transmission |
| K1 | DL data reception | Corresponding HARQ-ACK |
| K2 | UL scheduling DCI | Corresponding UL data transmission |

The BS may provide a HARQ-ACK feedback timing to the UE dynamically by DCI or semi-statically by RRC signaling. The NR system supports different minimum HARQ processing times for UEs. A HARQ processing time includes delay between a DL data reception timing and a corresponding HARQ-ACK transmission timing and delay between a UL grant reception timing and a corresponding UL data transmission timing. The UE transmits information about the capability of a minimum HARQ processing time thereof to the BS. From the viewpoint of the UE, HARQ ACK/NACK feedback for a plurality of DL transmissions in the time domain may be transmitted in one UL data/control region. A timing between DL data reception and corresponding ACK is indicated by the DCI.

Unlike the LTE system in which a transport block (TB)-based or codeword-based HARQ procedure is performed, the NR system supports code block group (CBG)-based transmission of single-bit/multi-bit HARQ-ACK feedback. A TB may be mapped to one or more code blocks (CBs) according to the size of the TB. For example, in a channel coding procedure, a cyclic redundancy check (CRC) code is attached to the TB. If a CRC-attached TB is not larger than a certain size, the CRC-attached TB corresponds to one CB. However, if the CRC-attached TB is larger than the certain size, the CRC-attached TB is segmented into a plurality of CBs. In the NR system, the UE may be configured to receive CBG-based transmissions, and retransmission may be scheduled to carry a subset of all CBs of the TB.

Referring to FIG. 9, the UE may detect a PDCCH in slot #n. The PDCCH includes DL scheduling information (e.g., DCI format 1_0 and/or DCI format 1_1). The PDCCH indicates a DL assignment-to-PDSCH offset K0 and a PDSCH-to-HARQ-ACK reporting offset K1. For example, DCI format 1_0 and DCI format 1_1 may include the following information.

Frequency domain resource assignment: indicates an RB resource assigned to a PDSCH (e.g. one or more (dis)continuous RBs)

Time domain resource assignment: Time domain resource assignment: indicates K0 and the starting position (e.g., OFDM symbol index) and length (e.g., the number of OFDM symbols) of a PDSCH in a slot.

PDSCH-to-HARQ_feedback timing indicator: indicates K1.

HARQ process number (4 bits): indicates a HARQ process identity (ID) for data (e.g., a PDSCH or a TB).

PUCCH resource indicator (PRI): indicates a PUCCH resource to be used for UCI transmission among a plurality of PUCCH resources in a PUCCH resource set.

Next, the UE may receive a PDSCH in slot #(n+K0) according to scheduling information of slot #n and then transmit UCI on a PUCCH in slot #(n+K1). The UCI includes a HARQ-ACK response to the PDSCH. In the case in which the PDSCH is configured to carry a maximum of one TB, the HARQ-ACK response may be configured in one bit. In the case in which the PDSCH is configured to carry up to two TBs, the HARQ-ACK response may be configured as two bits if spatial bundling is not configured and as one bit if spatial bundling is configured. When slot #(n+K1) is designated as a HARQ-ACK transmission timing for a plurality of PDSCHs, UCI transmitted in slot #(n+K1) includes HARQ-ACK responses to the plurality of PDSCHs.

Referring to FIG. 9, the UE may detect a PDCCH in slot #n. The PDCCH includes UL scheduling information (e.g., DCI format 0_0 and/or DCI format 0_1). DCI format 0_0 and DCI format 0_1 may include the following information.

Frequency domain resource assignment: indicates an RB set assigned to a PUSCH.

Time domain resource assignment: indicates a slot offset K2 and the starting position (e.g., symbol index) and length (e.g., the number of OFDM symbols) of a PUSCH in a slot. The starting symbol and length may be indicated by a start and length indicator value (SLIV) or may be indicated individually.

Thereafter, the UE may transmit the PUSCH in slot #(n+k2) according to the scheduling information of slot #n. Here, the PUSCH includes a UL-SCH TB.

PUCCH Resource Set

In order to transmit UCI through a PUCCH, the UE may receive a dedicated PUCCH resource configuration. This dedicated PUCCH resource configuration may include information about a PUCCH resource set. The information about the PUCCH resource set may include, for example, N PUCCH resources, a PUCCH format for each of the N PUCCH resources, a starting symbol, a PUCCH resource duration, a physical resource block (PRB) offset, and a cyclic shift (CS) set.

For example, the first PUCCH resource set of the dedicated PUCCH resource configuration may include a maximum of 32 PUCCH resources and the remaining PUCCH resource set of the dedicated PUCCH resource configuration may include a maximum of 8 PUCCH resources.

If an interlace is indicated to be used for PUCCH transmission, the UE may transmit a PUCCH using frequency hopping. If the interlace is not indicated to be used, the UE may transmit the PUCCH without frequency hopping.

Upon receiving downlink control information (DCI) scheduling a PDSCH and transmitting HARQ-ACK through the PUCCH as a response to the DCI, the UE may determine any one of 16 PUCCH resources included in the PUCCH resource set to transmit HARQ-ACK through the determined PUCCH resource. For example, the UE determines an index of a PUCCH resource, based on the number of control channel elements (CCEs) in a control resource set (CORE-SET) of a PDCCH including the DCI scheduling the PDSCH, an index of the first CCE of the PDCCH, and a value of a PUCCH resource indicator field included in the DCI scheduling the PDSCH. Then, the UE may transmit HARQ-ACK through a PUCCH resource corresponding to the determined index.

However, if the UE does not receive the dedicated PUCCH resource configuration (e.g., before the BS transmits the dedicated PUCCH resource configuration), the UE may acquire an index corresponding to any one of indexes in rows of Table 8 below from pucch-ResourceCommon.

TABLE 8

| Index | PUCCH format | First symbol | Number of symbols | PRB offset | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

The UE may determine an index of a PRB for PUCCH transmission, based on a PRB offset of the PUCCH resource set corresponding to the acquired index of the PUCCH resource set, the index of the PUCCH resource set, the number of initial CS indexes included in a set of initial CS indexes, and a BWP size. The UE may transmit the PUCCH through a PUCCH resource according to a PUCCH format, a starting symbol, and a symbol duration which correspond to the determined index of the PRB and the index of the PUCCH resource set.

In the case of the Rel-15 NR PUCCH, 5 PUCCH formats (PUCCH format 0/1/2/3/4) for each purpose are defined in consideration of a payload size, coverage, delay, and the like. In the Rel-16 NR-U, to satisfy regulatory requirements of unlicensed bands such as an occupied channel bandwidth (OCB) and power spectral density (PSD), a new PUCCH resource allocation method based on an interlaced RB allocation method in the Rel-15 PUCCH format. Similarly, to support the NR in a high frequency band of 52.6 GHz or more in Rel-17, it is necessary to improve a specific signal and channel design of the existing Rel-15/16. The present disclosure proposes a method of resource allocation of the existing PUCCH formats including an initial PUCCH resource and improving frequency hopping configuration in consideration of regulatory requirements such limits in maximum output and limits in PSD in a high frequency unlicensed band of 52.6 GHz or more.

The NR supports multiple numerologies (e.g., subcarrier spacing (SCS)) to support various 5G services. For example, when the SCS is 15 kHz, a wide area is supported in traditional cellular bands. When the SCS is 30 kHz/60 kHz, dense-urban, lower latency, and wider carrier bandwidth are supported. When the SCS is 60 kHz or higher, a bandwidth greater than 24.25 GHz is supported to overcome phase noise.

The NR frequency band is defined as two types (FR1 and FR2) of frequency range. FR1 and FR2 may be configured as shown in [Table 3] described above. FR2 may mean millimeter wave (mmW).

A band higher than the above-mentioned frequency band (e.g., 52.6 GHz to 114.25 GHz band, especially 71 GHz) is referred to as FR4, and the corresponding FR4 area may also be used as an unlicensed band.

In certain regions/countries, regulations regarding an unlicensed band may include restrictions on the PSD and maximum output power for certain nodes to transmit signals. For example, in some bands in the FR4 area (e.g., band 75, cl), there is a restriction that transmission needs satisfy a maximum output power of 40 dBm and a PSD of 23 dBm/1 MHz.

To transmit a PUCCH using maximum transmission power while satisfying the restriction proposed above, it is necessary to enhance a resource allocation method for existing PUCCH formats. [Table 9] shows the total number of PRBs according to SCS and bandwidth defined in the FR2 area.

TABLE 9

| SCS (kHz) | 50 MHZ $N_{RB}$ | 100 MHz $N_{RB}$ | 200 MHz $N_{RB}$ | 400 MHZ $N_{RB}$ |
|---|---|---|---|---|
| 60 | 66 | 132 | 264 | N.A |
| 120 | 32 | 66 | 132 | 264 |

Based on [Table 9], when the SCS increases to 240 kHz, 480 kHz, and 960 kHz, and the bandwidth increases to 800 MHz, 1600 MHz, and 2000 MHz, the total number of PRBs expected is shown in [Table 10].

TABLE 10

| SCS (kHz) | 50 MHz $N_{RB}$ | 100 MHz $N_{RB}$ | 200 MHz $N_{RB}$ | 400 MHz $N_{RB}$ | 800 MHz $N_{RB}$ | 1600 MHz $N_{RB}$ | 2000 MHz $N_{RB}$ |
|---|---|---|---|---|---|---|---|
| 60 | 66 | 132 | 264 | N.A | N.A | N.A | N.A |
| 120 | 32 | 66 | 132 | 264 | N.A | N.A | N.A |
| 240 | 16 | 32 | 66 | 132 | 264 | N.A | N.A |
| 480 | 8 | 16 | 32 | 66 | 132 | 264 | N.A |
| 960 | 4 | 8 | 16 | 32 | 66 | 132 | 160 |

The number of PRBs configured to proceed with simulation is as shown in [Table 11].

TABLE 11

| SCS (kHz) | 50 MHz $N_{RB}$ | 100 MHz $N_{RB}$ | 200 MHz $N_{RB}$ | 400 MHz $N_{RB}$ | 800 MHz $N_{RB}$ | 1600 MHz $N_{RB}$ | 2000 MHz $N_{RB}$ |
|---|---|---|---|---|---|---|---|
| 120 | 32 | 64 | 128 | 256 | N.A | N.A | N.A |
| 240 | 16 | 32 | 64 | 128 | 256 | N.A | N.A |
| 480 | 8 | 16 | 32 | 64 | 128 | 256 | N.A |
| 960 | 4 | 8 | 16 | 32 | 64 | 128 | 160 |

When the number of PRBs according to the SCS and the bandwidth is defined as in [Table 10] and/or [Table 11], it may not be easy to reuse the PUCCH format introduced in the existing NR or NR-U. Therefore, the present disclosure proposes an enhanced PUCCH format and an enhanced initial PUCCH resource set for FR4. An actual number of PRBs according to the SCS and bandwidth may differ from [Table 10] and/or [Table 11]. However, the following proposed methods based on the final determined number of PRBs may be easily expanded and applied.

In the FR4 area (e.g., band equal to or greater than 52.6 GHz), a limit of power that one node transmits to the maximum along with PSD regulation. For example, one node may use up to 40 dBm of power. Therefore, in consideration of PSD regulation and maximum power limit, the maximum power for transmitting in 1 PRB may be determined for each SCS. In addition, the maximum number of PRBs that do not exceed the maximum power limit while allocating power to each PRB to the maximum according to each SCS may be calculated as shown in [Table 12], [Table 13], and [Table 14]. [Table 12] shows the case in which PSD regulation is 23 dBm/1 MHz, and [Table 13] shows the case in which PSD regulation is 13 dBm/1 MHz.

TABLE 12

| SCS (kHz) | 1 PRB BW (MHz) | 1 PRB TX power (dBm) | # of PRBs | Total Tx power (dBm) |
|---|---|---|---|---|
| 120 | 1.44 | 24.58 | 34 | 39.89 |
| | | | 35 | 40.02 ➜ 40 |
| 240 | 2.88 | 27.59 | 17 | 39.89 |
| | | | 18 | 40.14 ➜ 40 |
| 480 | 5.76 | 30.60 | 8 | 39.63 |
| | | | 9 | 40.14 ➜ 40 |
| 960 | 11.52 | 33.61 | 4 | 39.63 |
| | | | 5 | 40.60 ➜ 40 |

When PSD regulation (requirement) is 38 dBm/1 MHz and the maximum power limit is 55 dBm for each node, [Table 13] may be achieved.

TABLE 13

| SCS (kHz) | 1 PRB BW (MHz) | 1 PRB TX power (dBm) | # of PRBs | Total Tx power (dBm) |
|---|---|---|---|---|
| 120 | 1.44 | 14.58 | 264 | 38.80 |
| | | | — | — |
| 240 | 2.88 | 17.59 | 174 | 39.99 |
| | | | 175 | 40.02 ➜ 40 |
| 480 | 5.76 | 20.60 | 87 | 39.99 |
| | | | 88 | 40.04 ➜ 40 |
| 960 | 11.52 | 23.61 | 43 | 39.95 |
| | | | 44 | 40.04 ➜ 40 |

TABLE 14

| SCS (kHz) | 1 PRB BW (MHz) | 1 PRB TX power (dBm) | # of PRBs | Total Tx power (dBm) |
|---|---|---|---|---|
| 120 | 1.44 | 39.58 | 34 | 54.89 |
| | | | 35 | 55.02 ➜ 55 |
| 240 | 2.88 | 42.59 | 17 | 54.89 |
| | | | 18 | 55.14 ➜ 55 |
| 480 | 5.76 | 45.60 | 8 | 54.63 |
| | | | 9 | 55.14 ➜ 55 |
| 960 | 11.52 | 48.61 | 4 | 54.63 |
| | | | 5 | 55.60 ➜ 55 |

In particular, # of PRBs are obtained the same in [Table 11] and [Table 13]. However, the examples in [Table 11] and [Table 13] are based on ETSI regulatory requirements in the European region. When # of PRBs is obtained differently from [Table 11] and [Table 13] through the requirements of other regions, # of PBBs obtained based on the requirements of other regions may be applied to the proposed methods according to the present disclosure.

Considering PSD requirements and maximum power limit, the minimum number of PRBs per subcarrier spacing (SCS) may be calculated. When the UE intends to transmit a PUCCH based on the maximum power, the BS needs to allocate more resources than the number of PRBs calculated in [Table 12] to [Table 14].

However, considering the number of available RBs according to the bandwidth (BW) size of bandwidth part (BWP), when the number of PRBs used for each PUCCH transmission increases, a sufficient number of frequency division multiplexing (FDM) resources may not be ensured or a frequency hopping interval may not be wide enough. Therefore, a new PUCCH resource configuration method that considers frequency hopping may be needed.

The PRB number proposed in the present disclosure basically means the number of contiguous PRBs for PUCCH format 0/1/2/3/4 transmission, but may also be extended to the form of interlaced PRB.

Hereinafter, in the present disclosure, a PUCCH resource allocation method and an improved PUCCH resource configuration method for increasing frequency hopping effect in consideration of regulation requirements in a high frequency band are proposed. In particular, a method of configuring frequency hopping of an initial PUCCH resource set is proposed.

Each proposed method described below may be combined and applied together as long as each proposed method does not contradict other proposed methods.

Tables for the initial PUCCH resource set of the NR are shown in [Table 8].

Referring to [Table 8], in the NR, when there are two "Set of initial CS indexes" (e.g., index 0, 3, 7, and 11), because PUCCH format 0/1 is transmitted using a single PRB (i.e., because one PRB is one FDM resource), a total of 8 PRBs are needed.

When there are 3 "Set of initial CS indexes" (e.g., index 1, 2), a total of 6 PRBs are required. When there are 4 "Set of initial CS indexes" (e.g., index 4, 5, 6, 8, 9, 10, 12, 13, 14, 15), a total of 4 PRBs are required.

In FR4, as described above, considering the PSD requirements and maximum power limit, the minimum PRB value to meet the maximum output power may be defined as shown in [Table 12]. To apply the minimum PRB value to the initial PUCCH resource set, the number of PRBs corresponding to one FDM resource may be configured to the minimum PRB as shown in [Table 12].

As described above, when there are two "Set of initial CS indexes" in [Table 8] (e.g., index 0, 3, 7, 11), a total of 8 FDM resources are required, and whether 8 FDM resources are configurable may be indicated according to each SCS value and/or nominal BW (Carrier/BWP BW) size as shown in [Table 15].

[Table 15] is based on the minimum number of PRBs in [Table 12]

TABLE 15

| SCS (kHz) | # of PRBs | ×8 | Nominal BW (Carrier/BWP BW) (MHz) | | | | |
|---|---|---|---|---|---|---|---|
| | | | 200 | 400 | 800 | 1600 | 2000 |
| 120 | 35 | 280 | X (>132) | X (>264) | NA | NA | NA |
| 240 | 18 | 144 | X (>66) | X (>132) | O (<264) | NA | NA |

US 12,641,613 B2

23

TABLE 15-continued

| SCS | # of | | Nominal BW (Carrier/BWP BW) (MHz) | | | | |
|---|---|---|---|---|---|---|---|
| (kHz) | PRBs | ×8 | 200 | 400 | 800 | 1600 | 2000 |
| 480 | 9 | 72 | X (>32) | X (>66) | O (<132) | O (<264) | NA |
| 960 | 5 | 40 | X (>16) | X (>32) | O (<66) | O (<132) | O (<160) |

Referring to [Table 15], when the size of nominal BW (Carrier/BWP BW) is 200 MHz or 400 MHz, 8 FDM resources may not be ensured for all SCS values.

When the "Set of initial CS indexes" in [Table 8] is 3 (e.g., index 1, 2), a total of 6 FDM resources are required. Whether 6 FDM resources are configurable may be expressed according to each SCS value and/or nominal BW (Carrier/BWP BW) size as shown in [Table 16]. [Table 16] is based on the minimum number of PRBs in [Table 12].

TABLE 16

| SCS | # of | | Nominal BW (Carrier/BWP BW) (MHz) | | | | |
|---|---|---|---|---|---|---|---|
| (kHz) | PRBs | ×6 | 200 | 400 | 800 | 1600 | 2000 |
| 120 | 35 | 210 | X (>132) | X (>264) | NA | NA | NA |
| 240 | 18 | 108 | X (>66) | X (>132) | O (<264) | NA | NA |
| 480 | 9 | 54 | X (>32) | X (>66) | O (<132) | O (<264) | NA |
| 960 | 5 | 30 | X (>16) | X (>32) | O (<66) | O (<132) | O (<160) |

Referring to [Table 16], when the size of nominal BW (Carrier/BWP BW) is 200 MHz, 6 FDM resources may not be ensured for all SCS values.

Therefore, in FR4, the minimum number of PRBs to satisfy the maximum output power calculated in [Table 12] may not be applied to the initial PUCCH resource set of the existing NR system without change. In other words, even if there is some loss in terms of power and a slight decrease in coverage or reliability, required 16 PUCCH resources are ensured for each PUCCH resource set and at the same time, it is necessary to configure/indicate PUCCH resources with the number of PRBs considering multiplexing (e.g., FDM) with the initial PUCCH resource set used by other adjacent cells.

As seen from [Table 15] and [Table 16], considering the total number of available RBs for each size of the initial BWP, frequency diversity effect of the current NR Rel-15 form of frequency hopping is different for each PUCCH resource set. For a certain PUCCH resource, a frequency hopping interval may be significantly narrowed.

The purpose of first introducing PRB offset in Rel-15 is for inter-cell FDM coexistence for initial PUCCH transmission. Therefore, as described above, when transmitting the PUCCH using multiple PRBs, the PRB offset defined in [Table 8] needs to be discussed again for FDM between other adjacent cells.

For indexes 1 and 2 in [Table 8], FDM between 2-cells is considered, and for indexes 4, 5, 6, 8, 9, 10, 12, 13 and 14, FDM between 3-cells is considered. In [Table 8], indexes 0, 3, 7, and 11 are achieved by considering extreme channel delay situations such as Cell-Edge UE, and index 15 is achieved by considering special cell deployment situations.

In detail, in the case of indexes 1 and 2 of [Table 8], 3 PRBs are allocated for one PUCCH resource set, and thus 2 cells are FDM to each other using PRB offset=3. In the case of indexes 4, 5, 6, 8, 9, 10, 12, 13, and 14 in [Table 8], 2 PRBs are allocated for one PUCCH resource set, and thus 3 cells may be FDM each other using PRB offset=2 or 4.

Therefore, [Table 8] is designed to target full FDM between 2/3-cells when the PUCCH format 0/1 of the existing Rel-15 is transmitted through one PRB, and thus when the number of RBs to be used for PUCCH transmission in a band of 52.6 GHz is increased, an improved PUCCH resource allocation and setting method may be needed to evenly derive FDM and frequency hopping effects between PUCCH resource sets.

Hereinafter, the PUCCH resource allocation method using frequency hopping to evenly derive the frequency hopping effect between PUCCH resource sets according to the proposed methods of the present disclosure.

Figure 10:
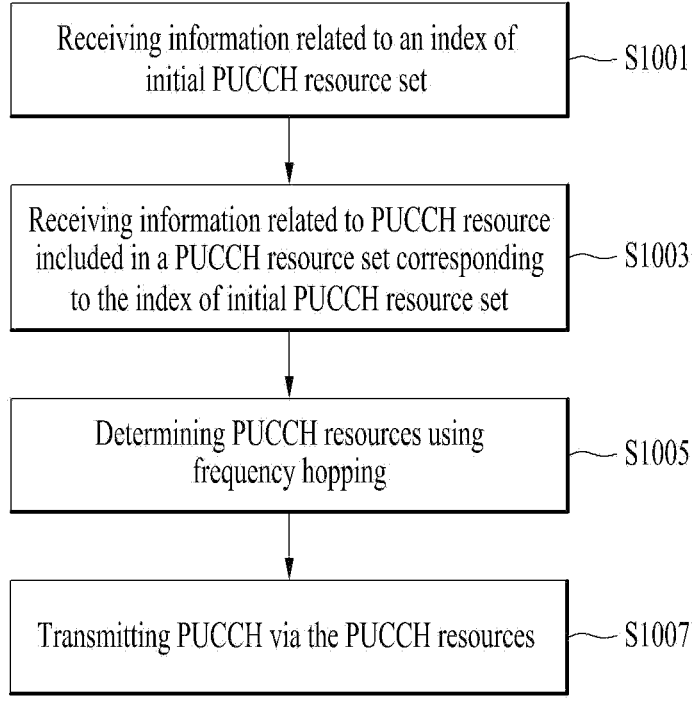
FIGS. 10 to 12 are diagrams for explaining an operation process of a user equipment (UE) and a base station (BS) according to an embodiment of the present disclosure.
Figure 11:
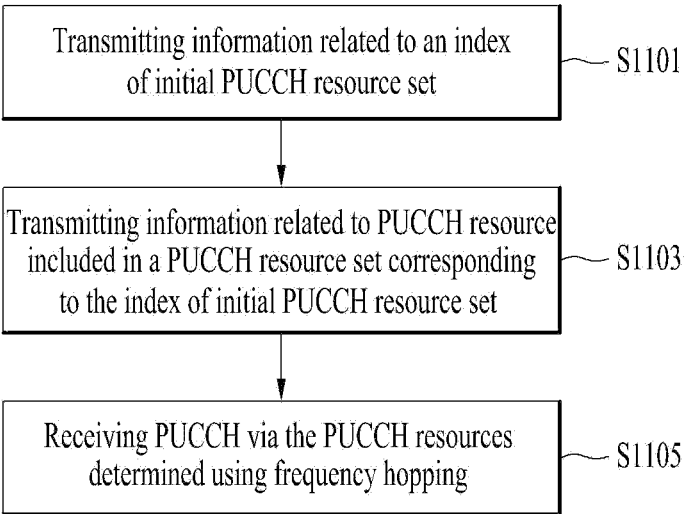
Figure 12:
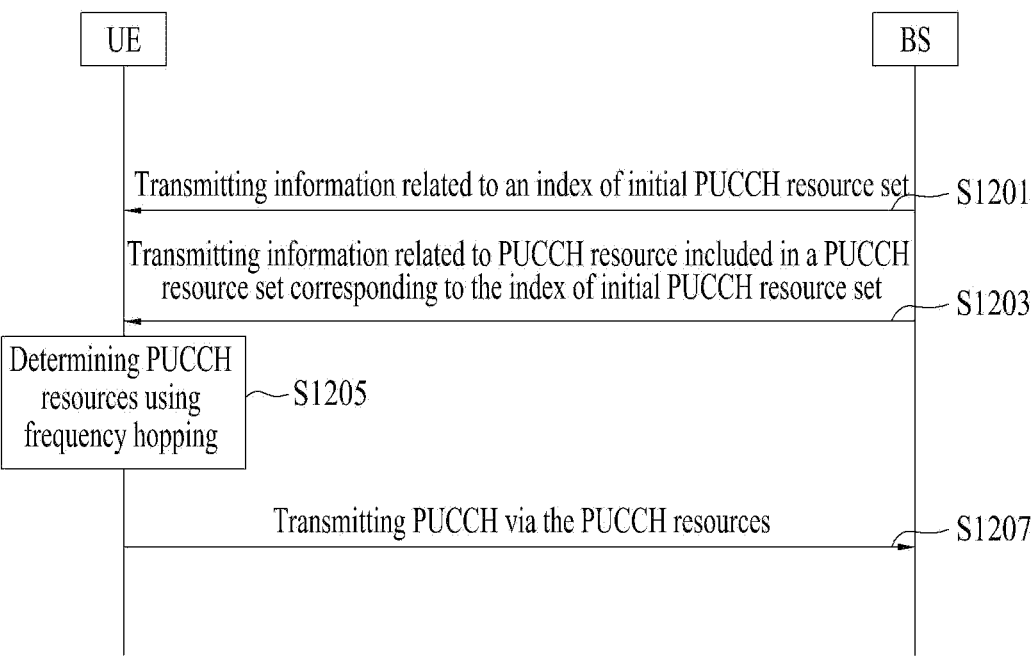

FIGS. 10 to 12 are diagrams for explaining the overall operation process of a UE and a BS according to [Proposed Method #1] of the present disclosure.

FIG. 10 is a diagram for explaining the overall operation process of the UE according to [Proposed Method #1]. Referring to FIG. 10, the UE may receive information related to an index of one initial PUCCH resource set among the initial PUCCH resource sets in [Table 8] through Radio Resource Control (RRC) signaling (e.g., pucch-Resource-Common). (S1001). The UE may receive Downlink Control Information (DCI) containing information for determining any one of a plurality of PUCCH resources included in the initial PUCCH resource set corresponding to the index (S1003).

To transmit the PUCCH based on frequency hopping, the UE may determine a PUCCH resource for each of a lower hop and an upper hop based on the DCI described above (S1005). For example, the UE may determine an index of the PUCCH resource based on the PUCCH resource indicator field included in the DCI, the number of CCEs through which the DCI is transmitted, and a first CCE index.

The UE may determine the lowest (or highest) PRB index in each of the lower hop and the upper hop based on an index of the PUCCH resource. Consecutive PRBs as many as the number of PRBs (i.e., $N_{RB}$) from the lowest (or highest) PRB index may be determined as PUCCH resources.

As described above, specific details on a method of determining the PUCCH resource by the UE may be based on [Proposed Method #1] described later.

The UE may transmit the PUCCH through the determined PUCCH resource (S1007).

FIG. 11 is a diagram for explaining the overall operation process of a BS according to [Proposed Method #1] of the present disclosure. Referring to FIG. 11, the BS may transmit information related to an index of one initial PUCCH resource set among the initial PUCCH resource sets in [Table 8] through radio resource control (RRC) signaling (e.g., pucch-ResourceCommon) (S1101). The BS may transmit downlink control information (DCI) including information for determining any one of a plurality of PUCCH resources included in the initial PUCCH resource set corresponding to the index (S1103).

The BS may receive the PUCCH through the PUCCH resource for each of the lower hop and the upper hop based on determination based on the DCI described above (S1105). That is, the BS may receive the PUCCH through the PUCCH resource determined based on frequency hopping. A specific method for determining a PUCCH resource based on frequency hopping may be based on [Proposed Method #1].

FIG. 12 is a diagram for explaining the overall operation process of a network according to [Proposed Method #1] of the present disclosure. Referring to FIG. 12, the BS may transmit information related to an index of one initial PUCCH resource set among the initial PUCCH resource sets in [Table 8] through radio resource control (RRC) signaling (e.g., pucch-ResourceCommon) to the UE (S1201). The BS may transmit downlink control information (DCI) containing information for determining any one of a plurality of PUCCH resources included in the initial PUCCH resource set corresponding to the index to the UE (S1203).

To transmit the PUCCH based on frequency hopping, the UE may determine a PUCCH resource for each of the lower hop and the upper hop based on the DCI described above (S1205). For example, the UE may determine the index of the PUCCH resource based on the PUCCH resource indicator field included in the DCI, the number of CCEs through which the DCI is transmitted, and the first CCE index.

The UE may determine the lowest (or highest) PRB index in each of the lower hop and the upper hop based on the index of the PUCCH resource. Consecutive PRBs as many as the number of PRBs (i.e., $N_{RB}$) from the lowest (or highest) PRB index may be determined as PUCCH resources.

As described above, specific details on the method of determining the PUCCH resource by the UE may be based on [Proposed Method #1] described later.

The UE may transmit the PUCCH to the BS through the determined PUCCH resource (S1207).

[Proposed Method #1]

Considering the frequency division multiplexing (FDM) of inter-cell PUCCH resources and the BW size of the initial BWP, a method of determining a frequency resource to evenly configure a frequency hopping distance of the improved PUCCH Format 0/1 for each initial PUCCH resource set will be described.

In the following description, N refers to the number of available RBs in a BWP, and enhanced PUCCH Format 0/1 refers to a multi-RB PUCCH transmitted through consecutively allocated NRB PRBs.

Among the available RBs of the BWP, an index of the lowest frequency RB is 0, and an index of the highest frequency RB is (N−1). The improved PUCCH Format 0/1 is transmitted to the consecutively allocated $N_{RB}$ number of RBs. A hopping direction of a frequency resource determination method of a lower hop and an upper hop of PUCCH resource indexes 0 to 7 described below and a hopping direction of a frequency resource determination method of a lower hop and an upper hop of PUCCH resource indexes 8 to 15 may be opposite.

The upper hop refers to a hop located at a high frequency during frequency hopping, and the lower hop refers to a hop located at a low frequency during frequency hopping. For example, the upper hop means a hop that includes RB index #(N−1) or is closer to RB index #(N−1) among two hops. The low hop refers to a hop that includes RB index #0 or is closer to RB index #0 among two hops.

1. Embodiment #1-1

When mapping a PUCCH resource located in the upper hop on the frequency domain (F-domain), a start RB index calculated based on an equation of each example may be determined as a high frequency RB, and frequency resources may be configured as many as $N_{RB}$ in a direction of the low frequency RB from the corresponding start RB index.

(1) In the case of three sets of initial CS indexes and initial PUCCH resource set index 1/2 that needs to consider FDM between 2-cells 1) In the case of index 1, the lower hop may be allocated as many as $N_{RB}$ in a direction of a high frequency from RB index #0, and the upper hop may be allocated as many as $N_{RB}$ in a direction of a low frequency from RB index #{(N−1)−3×$N_{RB}$}.

2) In the case of index 2, the lower hop may be allocated as much as $N_{RB}$ in a direction of the high frequency from RB index #(3×$N_{RB}$), and the upper hop may be allocated as much as $N_{RB}$ in a direction of the low frequency from RB index #{N−1}.

(2) In the case of four sets of initial CS indexes and initial PUCCH resource set index 4/5/6 or 8/9/10 or 12/13/14 that needs to consider FDM between 3-cells 1) In the case of index 4 (or index 8 or index 12), the lower hop may be allocated as many as $N_{RB}$ in a direction of a high frequency from RB index #0, and the upper hop may be allocated as many as $N_{RB}$ in a direction of a low frequency from RB index #{(N−1)−4×$N_{RB}$}.

2) In the case of index 5 (or index 9 or index 13), the lower hop may be allocated as many as $N_{RB}$ in a direction of a high frequency from RB index #(2×$N_{RB}$), and the upper hop may be allocated as many as $N_{RB}$ in a direction of a low frequency from RB index #{(N−1)−2×$N_{RB}$}.

3) In the case of index 6 (or index 10 or index 14), the lower hop may be allocated as many as $N_{RB}$ in a direction of a low frequency from RB index #(4×$N_{RB}$), and the upper hop may be allocated as many as $N_{RB}$ in a direction of a low frequency from RB index #{N−1}.

2. Embodiment #1-2

When mapping the PUCCH resource located in the upper hop on the frequency domain (F-domain), a start RB index calculated based on an equation of each example is determined as low frequency RB, and frequency resources may be configured as many as $N_{RB}$ in a direction of a high frequency from the corresponding start RB index.

(1) In the case of three sets of initial CS indexes and initial PUCCH resource set index 1/2 that needs to consider FDM between 2-cells 1) In the case of index 1, the lower hop may be allocated as many as $N_{RB}$ in a direction of a high frequency from RB index #0, and the upper hop may be allocated as many as $N_{RB}$ in a direction of a high frequency from RB index #{(N−1)−6×$N_{RB}$}.

2) In the case of index 2, the lower hop may be allocated as many as $N_{RB}$ in a direction of a high frequency from RB index #($3 \times N_{RB}$), and the upper hop may be allocated as many as $N_{RB}$ in a direction of a high frequency from RB index #{($N-1$)–$3 \times N_{RB}$}.

(2) In the case of four sets of initial CS indexes and initial PUCCH resource set index 4/5/6 or 8/9/10 or 12/13/14 that needs consider FDM between 3-cells 1) In the case of index 4 (or index 8 or index 12), the lower hop may be allocated as many as $N_{RB}$ in a direction of a high frequency from RB index #0, and the upper hop may be allocated as many as $N_{RB}$ in a direction of a high frequency from RB index #{($N-1$)–$6 \times N_{RB}$}.

2) In the case of index 5 (or index 9 or index 13), the lower hop may be allocated as many as $N_{RB}$ in a direction of a high frequency from RB index #($2 \times N_{RB}$), and the upper hop may be allocated as many as $N_{RB}$ in a direction of a high frequency from RB index #{($N-1$)–$4 \times N_{RB}$}.

3) In the case of index 6 (or index 10 or index 14), the lower hop may be allocated as many as $N_{RB}$ in a direction of a high frequency from RB index #($4 \times N_{RB}$), and the upper hop may be allocated as many as $N_{RB}$ in a direction of a high frequency from RB index #{($N-1$)–$2 \times N_{RB}$}.

3. Embodiment #1-3

A method of determining a frequency resource to evenly configure a frequency hopping distance for each PUCCH resource in a cell in the case of an initial PUCCH resource set that does not consider frequency division multiplexing (FDM) of inter-cell PUCCH resources.

(1) In the case of initial PUCCH resource set index 0/3/7/11, which requires 8 FDM resources to allocate 16 PUCCH resources within the PUCCH resource set with 2 sets of initial CS indexes, virtual FDM between 2-cells may be assumed and a size equal to half the number of resources required for FDM may be configured to a frequency hopping distance.

1) The lower hop may be allocated as much as $N_{RB}$ in a high frequency direction from RB index #0, and the upper hop may be allocated as much as $N_{RB}$ in the high frequency direction from RB Index #{($N-1$)–4× N_RB}.

4. Embodiment #1-4

An initial BWP may be divided into sub-bands equal to the number of inter-cells FDMed in the frequency domain, and frequency hopping may be performed within the sub-band for each PUCCH resource set to map PUCCH resources.

Hereinafter, details of [Proposed Method #1] will be described.

To easily understand [Proposed Method #1], a method of mapping PUCCH resources within the initial PUCCH resource set of the existing Rel-15 on the frequency axis will be described.

For example, FIG. 13 shows an example in which RBs of the PUCCH resource of initial PUCCH resource set index 4, in which the number of sets of initial CS indexes according to [Table 8] in Rel 15 is 4, are allocated. Referring to FIG. 13, one PRB is required for Rel-15 PUCCH format 0/1, and as many UEs as the number of initial CS indexes (i.e., 4) may be multiplexed on the same time-frequency resource, and thus to allocate 16 PUCCH resources, a maximum of 4 FDM resources (i.e., 4 RBs) are required.

Depending on a PUCCH resource index value $r_{PUCCH}$, 0 to 7 may hop from low frequency RB to high frequency RB, and 8 to 15 may hop in an opposite direction (i.e., from high frequency RB to low frequency RB) to map the PUCCH to RBs.

In FIG. 13, numbers 0 to 15 written in RBs represent a value of $r_{PUCCH}$. That is, four UEs with different CS index values 0/3/6/9 may be multiplexed on one low frequency RB. Therefore, 4 FDM resources may be required to multiplex a total of 16 UEs.

In Rel 15, for example, when a cell configured with initial PUCCH resource set index 5 is adjacent to a cell configured with initial PUCCH resource set index 4, the PUCCH resources within the initial PUCCH resource set index 5 may be configured to be mapped at an interval of 2 RBs from a low frequency RB and 2 RBs from a high frequency RB as many as a PRB offset value not to overlap with the frequency domain to which the PUCCH resource in initial PUCCH resource set index 4 is mapped.

However, when PUCCH Format 0/1 is transmitted through multiple RBs in FR4, as described above, an effect of frequency hopping may be different for each PUCCH resource within the PUCCH resource set in consideration of a BWP size of an initial BWP and the number of available RBs. In consideration of inter-cell FDM, an improved method of determining a frequency of a PUCCH resource may be needed to evenly configure the frequency diversity gain between the initial PUCCH resource sets and PUCCH resources. Therefore, a method of determining a frequency for evenly configuring a frequency hopping distance of a PUCCH resource for each PUCCH resource set index in consideration of the above description in [Proposed Method #1] is proposed.

In detail, Example #1-1 and Example #1-2 are different in a method of allocating $N_{RB}$ from a PUCCH resource start RB index of the upper hop calculated according to an equation. For example, according to Example #1-1, RBs are mapped as many as $N_{RB}$ in a low frequency direction from a start RB index. In contrast, according to Embodiment #1-2, RBs are mapped as many as $N_{RB}$ in a high frequency direction from a start RB index.

Inter-cell FDM may be additionally considered. For example, a PRB offset may be scaled as many as $N_{RB}$ in consideration of FDM between 2-cells in initial PUCCH resource set index 1/2, and FDM between 3-cells between initial PUCCH resource set index 4/5/6 or 8/9/10 or 12/13/14. As such, a PUCCH resource occupied by another cell and a PUCCH resource occupied by the corresponding cell may be mapped not to overlap.

However, when the upper hop is mapped as before, a frequency distance between another FDM cell and the PUCCH resource of the corresponding cell becomes too close, and the frequency diversity effect may be reduced. Accordingly, the frequency hopping effect between the initial PUCCH resource set and the PUCCH resource may be different.

Therefore, to evenly configure a frequency hopping distance for inter-cell PUCCH, the upper hop for a PUCCH of a cell with a PRB offset value of 0 among existing FDM cells may be mapped at an interval of PRB offset×$N_{RB}$ instead of a method of mapping the upper hop from a highest frequency RB, a frequency hopping effect between the initial PUCCH resource set and the PUCCH resource may be equalized.

For example, an example of initial PUCCH resource set index #1/2 in Example #1-1 will now be described. With regard to a start RB index of the upper hop, when the number of available RBs in an initial BWP is N, a highest frequency RB index may be (N−1), and one PUCCH occupies as many as consecutive $N_{RB}$s. Therefore, in the case of initial PUCCH resource set index 1, to leave a space in which a PUCCH resource of initial PUCCH resource set index 2 is to be mapped from a highest frequency RB, a resource for PUCCH transmission may be allocated in a low frequency direction from a start RB index at an interval of a value obtained by multiplying a PRB offset value by $N_{RB}$. In this case, the PRB offset value is a PRB offset value (e.g., 3) of initial PUCCH resource set index 2. In other words, the PRB offset value may be a PRB Offset value (e.g., 3) configured for FDM between initial PUCCH resource set index 1/2. Embodiment #1-2 has the same principle as Embodiment #1-1 in which a start RB index of the upper hop is the lowest frequency at which the PUCCH is to be mapped, and relates to a method of allocating resources as many as $N_{RB}$ in a high frequency direction from a start RB index.

Figure 14:
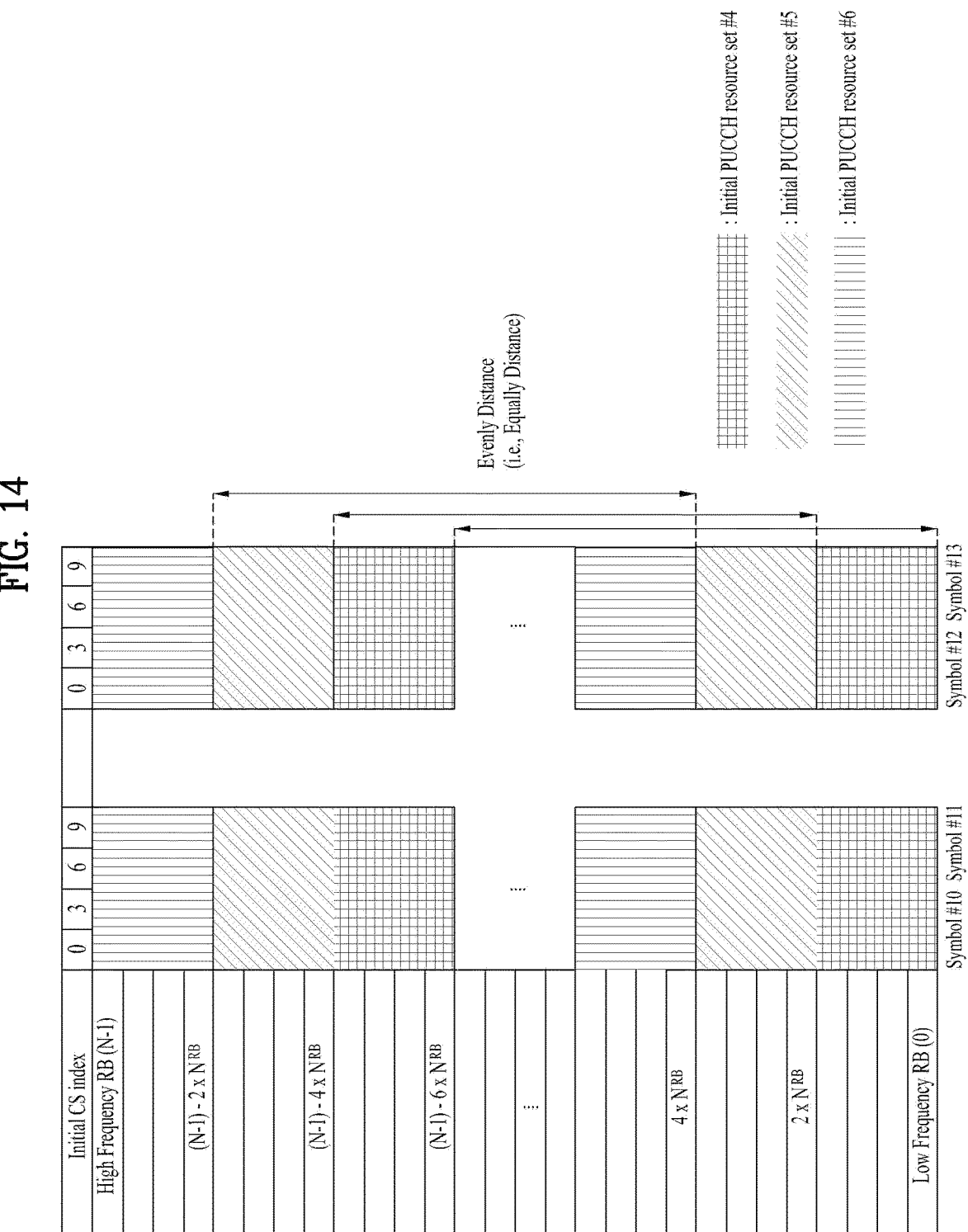
FIG. 14 is a diagram for explaining an example in which a PUCCH resource is allocated using frequency hopping within a plurality of initial PUCCH resource sets according to an embodiment of the present disclosure.

With reference to FIG. 14, a detailed embodiment will be described. FIG. 14 shows a PUCCH resource allocation method of initial PUCCH resource set index #4/5/6 for considering FDM between three cells according to Embodiment #1-2 of the present disclosure.

The lower hop of initial PUCCH resource set index 4 starts from RB index #0, the lower hop of initial PUCCH resource set index 5 starts from RB index #($2 \times N_{RB}$), and the lower hop of initial PUCCH resource set index 6 starts from RB index #($4 \times N_{RB}$). Thus, to evenly configure a distance between the lower hop and the upper hop, the upper hop of initial PUCCH resource set index 6 may be allocated up to RB index #$\{(N-1)-2 \times N_{RB}\}$ from RB index #(N−1), the upper hop of initial PUCCH resource set index 5 may be allocated up to RB index #$\{(N-1)-4 \times N_{RB}\}$, and the upper hop of initial PUCCH resource set index 4 may be allocated up to RB index #$\{(N-1)-6 \times N_{RB}\}$.

Accordingly, in the case of the lower hop, 16 PUCCH resources included in initial PUCCH resource set index 4 may be mapped within the frequency resource allocated as much as $N_{RB}$ in a high frequency direction from RB index #0, and in the case of the upper hop, 16 PUCCH resources included in initial PUCCH resource set index 4 may be mapped within the frequency resource allocated as much as $N_{RB}$ in a high frequency direction from RB index #$\{(N-1)-6 \times N_{RB}\}$.

PUCCH resource set index 5 may be allocated in the upper hop at an interval of a value obtained by multiplying a PRB Offset value (e.g., 2) configured for FDM between initial PUCCH resource set index 4/5/6 to allocate initial PUCCH resource set index 6 from a highest Frequency RB, by $N_{RB}$, and PUCCH resource set index 4 may be allocated in the upper hop at an interval that is twice the value obtained by multiplying the PRB Offset value (e.g., 2) by $N_{RB}$. In other words, PRBs for each PUCCH resource set may be allocated at an interval of a value obtained by multiplying a difference between the PRB Offset values of each PUCCH resource set index by $N_{RB}$.

For example, a PRB offset value of initial PUCCH resource set index 6 is 4, and a PRB offset value of initial PUCCH resource set index 4 is 0, and thus an upper hop RB of initial PUCCH resource set index 4 and an upper hop RB of initial PUCCH resource set index 6 may be allocated at an interval of a value obtained by multiplying a difference 4 between PRB offset values by $N_{RB}$.

Similarly, a PRB offset value of initial PUCCH resource set index 5 is 2 and a PRB offset value of initial PUCCH resource set index 4 is 0, and thus the upper hop RB of initial PUCCH resource set index 4 and the upper hop RB of initial PUCCH resource set index 5 may be allocated at an interval of a value obtained by multiplying a difference 2 in the PRB offset values by $N_{RB}$.

Through this method, the frequency diversity gain between different cells that FDM PUCCH resources using different PUCCH resource sets may be equally divided. In other words, a frequency hopping effect between different cells that FDM PUCCH resources may be equally derived by using different PUCCH resource sets.

Embodiment #1-3 relates to an RB mapping method of initial PUCCH resource set index 0/3/7/11 that does not consider inter-cell FDM. As PUCCH Format 0/1 according to initial PUCCH resource set index 0/3/7/11 is transmitted using Multi-RB, PUCCH resources located close to the center of a BWP may not obtain frequency diversity gain.

Therefore, in consideration of virtual 2-cell FDM, a frequency hopping distance equal to half a required number of FDM resources may be determined. In other words, because there are two sets of CS indexes, a total of 8 resources are required, and thus each PUCCH resource may be mapped with a distance between PUCCH resources equal to a PRB offset value of $4 \times N_{RB}$.

Example #1-4 relates to a method in which a BW of a BWP is divided into sub-bands as many as necessary for inter-cell FDM and frequency hopping is performed in a sub-band for each cell.

For example, in the case of initial PUCCH resource set index 1/2, FDM between 2-cells is required, and thus available RB N in the entire BWP may be divided by 2 and RB index #$\{(N/2)-1\}$ are used for initial PUCCH resource set index 1, and RB index #(N/2) to RB index #(N−1) are used for initial PUCCH resource index 2. In other words, PUCCH occupying the $N_{RB}$ RBs may be mapped in the same way as frequency hopping from a lower hop to a higher hop within a sub-band for each initial PUCCH resource set.

Hereinafter, a method of applying an orthogonal cover code (OCC) and a cyclic shift (CS) to a demodulation reference signal (DMRS) for PUCCH Format 4 will be described.

FIGS. 15 to 17 are diagrams for explaining the overall operation process of a UE and a BS for transmitting PUCCH Format 4 according to [Proposed Method #2] and/or [Proposed Method #3].

FIG. 15 is a diagram for explaining the overall operation process of a UE according to [Proposed Method #2] and/or [Proposed Method #3].

Referring to FIG. 15, the UE may receive information related to an OCC length of a DMRS for PUCCH format 4 through an RRC signal (S1501). The UE may generate a DMRS for PUCCH format 4 based on the OCC length and a CS value corresponding to the corresponding OCC length (S1503). In this case, a detailed method for generating the DMRS by the UE may be based on [Proposed Method #2] and/or [Proposed Method #3].

The UE may transmit PUCCH format 4 and the corresponding DMRS (S1505).

FIG. 16 is a diagram for explaining the overall operation process of a BS according to [Proposed Method #2] and/or [Proposed Method #3].

Referring to FIG. 16, the BS may transmit information related to an OCC length of a DMRS for PUCCH format 4 through an RRC signal (S1601). The BS may receive the corresponding OCC length, a DMRS generated based on a CS value corresponding to the corresponding OCC value, and PUCCH format 4 for the corresponding DMRS (S1603). A method of generating the DMRS based on the corresponding OCC length and the CS value corresponding to the corresponding OCC length may be based on [Proposed Method #2] and/or [Proposed Method #3].

FIG. 17 is a diagram for explaining the overall operation process of a network according to [Proposed Method #2] and/or [Proposed Method #3].

Referring to FIG. 17, a BS may transmit information related to an OCC length of the DMRS for PUCCH format 4 to a UE through an RRC signal (S1701). The UE may generate the DMRS for PUCCH format 4 using the OCC length and the CS value corresponding to the corresponding OCC length based on the received information (S1703). In this case, a detailed description of a method of generating the DMRS by the UE may be based on [Proposed Method #2] and/or [Proposed Method #3].

The UE may transmit PUCCH format 4 and the corresponding DMRS to the BS (S1705).

[Proposed Method #2]

A method of supporting multiplexing between misaligned RBs through code division multiplexing (CDM) between adjacent DMRS symbols when the number of RBs and a start RB used for enhanced PUCCH format 4 transmission to which multi-RB is allocated are configured/indicated differently for each UE will be described. Here, CDM between adjacent DMRS symbols may mean that a time-domain orthogonal cover code (OCC) is applied to the DMRS symbols.

In this case, when frequency hopping is not performed on enhanced PUCCH format 4, the number of DM-RS symbols of the entire PUCCH needs to be 2. When frequency hopping is performed on enhanced PUCCH Format 4, the number of DMRS symbols for each hop needs to be 2, and the time-domain OCC of length-2 may be applied to two DMRS symbols in the same hop. In other words, when frequency hopping is performed, two DMRS symbols within the same hop may be multiplied by a time domain OCC of length-2.

The existing PUCCH Format 4 may occupy 1 PRB, and uplink control information (UCI) on which DMRS and discrete Fourier transform (DFT) calculations are performed may be configured in a time division multiplexing (TDM) structure. At this time, UCI may support multiplexing for multiple UEs based on CDM through (virtual) frequency orthogonal cover code (OCC) before DFT calculation.

However, as described above, PUCCH format 4 may be transmitted using a plurality of RBs in an FR4 unlicensed band, and the RB number $N_{RB}$ used for PUCCH Format 4 transmission may be different depending on a distance between the BS and the UE and/or a scenario such as indoor/outdoor situation. Therefore, $N_{RB}$ may be configured/indicated differently for each UE.

Because the number of RBs used for PUCCH Format 4 transmission is different for each UE and the start RB is also different, time-domain OCC may be applied to adjacent DMRS symbols for multiplexing between UEs to which misaligned RBs are assigned.

As an example of allocating a misaligned RB, it is assumed that a total of 10 RBs from RB index #0 to RB index #9 are allocated to UE1 as $N_{RB}$ for PUCCH Format 4 transmission, and a total of 5 RBs from RB index #0 to RB index #4 are allocated to UE2 as $N_{RB}$. In this case, to multiplex UE1 and UE2, which have different RB start points and different numbers of RBs, when adjacent DM-RS symbols are multiplied by time-domain OCC, the BS may distinguish between UE1 and UE2, and thus multiplexing of PUCCH Format 4 of UE1 and UE2 may be possible.

Because at least two DMRS symbols are required, when frequency hopping is not performed on enhanced PUCCH Format 4 indicated for each UE, the number of DM-RSs of the entire PUCCH needs to be two. In contrast, when frequency hopping is performed, the number of DMRS symbols for each hop needs to be two. That is, a time-domain OCC of length-2 may be applied to two DMRS symbols within the same hop. In other words, when frequency hopping is performed, two DMRS symbols within the same hop may be multiplied by a time domain OCC of length-2.

According to [Proposed Method #2], even if PUCCH Format 4 transmitted through multiple RBs are transmitted through different start RB Indexes and different RB numbers, each UE that transmits each of the multiplexed PUCCH Format 4 through OCC may be distinguished.

[Proposed Method #3]

A method of mapping a CS value of a DMRS depending on an OCC index when OCC length=6 is supported in enhanced PUCCH format 4 using multi-RB will be described.

In the case of the existing Rel-15 PUCCH Format 4, UCI is multiplied by (virtual) frequency domain OCC for multiplexing before DFT calculation. Because UEs need to be distinguished through a DMRS, an OCC index and a CS value are paired and defined as shown in [Table 17].

TABLE 17

| Orthogonal sequence index | Cyclic shift index $m_0$ | | |
|---|---|---|---|
| n | $N_{SF}^{PUCCH,s} = 1$ | $N_{SF}^{PUCCH,s} = 2$ | $N_{SF}^{PUCCH,s} = 4$ |
| 0 | 0 | 0 | 0 |
| 1 | — | 6 | 6 |
| 2 | — | — | 3 |
| 3 | — | — | 9 |

Here, SF is a spreading factor. When SF=2 (i.e., OCC length=2), multiplexing is possible for up to 2 UEs, and when SF=4 (i.e., OCC length=4), multiplexing is possible for up to 4 UEs are possible. According to [Table 17], when SF=2, a CS value of a DMRS is 0 or 6, and when the CS value of the DMRS is 0, a UCI is multiplied by a sequence corresponding to orthogonal sequence index number 0. When the CS value of the DMRS is 6, the UCI is multiplied by a sequence corresponding to orthogonal sequence index number 1. Here, the orthogonal sequence is defined as [Table 18] for SF=2, and the orthogonal sequence is defined as [Table 19] for SF=4.

TABLE 18

| n | $w_n$ |
|---|---|
| 0 | [+1 +1] |
| 1 | [+1 −1] |

TABLE 19

| n | $w_n$ |
|---|---|
| 0 | [+1 +1 +1 +1] |
| 1 | [+1 −j −1 +j] |
| 2 | [+1 −1 +1 −1] |
| 3 | [+1 +j −1 −j] |

However, in FR4, because PUCCH Format 4 may also be transmitted through multiple RBs, introduction of a longer OCC length may be considered. In addition, more UEs (e.g., 6) may be multiplexed and transmitted.

To this end, OCC length=6 may be supported, and when OCC length=2 and OCC length=4, just as an orthogonal sequence index and a CS value of a DMRS are paired, respectively, OCC length=6 pairing may also be defined and applied.

When OCC length=4, a CS interval is 6, but when OCC length=6, the CS interval may be configured to 2. In this case, when only OCCs with a number of OCCs less than 6 (e.g., 3) are allocated, a CS order is configured such that a gap difference between adjacent CSs is the largest. To match the order of 0/6, which is a CS for a UE of OCC length=2, in the case of OCC length=4, the CS order is configured to 0/6/3/9.

Considering this, even when OCC length=6, a preceding order of the CS may be configured to 0/6. Accordingly, a proposed combination of orthogonal sequence index n and the CS value is as shown in [Table 20].

TABLE 20

| Orthogonal sequence index n | Cyclic shift index $m_0$ | | | |
|---|---|---|---|---|
| | $N_{SF}^{PUCCH,s} = 1$ | $N_{SF}^{PUCCH,s} = 2$ | $N_{SF}^{PUCCH,s} = 4$ | $N_{SF}^{PUCCH,s} = 6$ |
| 0 | 0 | 0 | 0 | 0 |
| 1 | — | 6 | 6 | 6 |
| 2 | — | — | 3 | 4 |
| 3 | — | — | 9 | 10 |
| 4 | — | — | — | 2 |
| 5 | — | — | — | 8 |

According to [Proposed Method #3], PUCCH Format 4 is multiplexed and allocated to up to 6 UEs, which is more than before, through multiple RBs, and PUCCH Format 4 transmitted by each UE may be distinguished.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

FIG. 18 illustrates a communication system 1 applied to the present disclosure.

Referring to FIG. 18, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD)

mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

FIG. 19 illustrates wireless devices applicable to the present disclosure.

Referring to FIG. 19, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Specifically, instructions and/or operations, controlled by the processor 102 of the first wireless device 100 and stored in the memory 104 of the first wireless device 100, according to an embodiment of the present disclosure will be described.

Although the following operations will be described based on a control operation of the processor 102 in terms of the processor 102, software code for performing such an operation may be stored in the memory 104. For example, in the present disclosure, the at least one memory 104 may be a computer-readable storage medium and may store instructions or programs. The instructions or programs may cause, when executed, the at least one processor operably connected to the at least one memory to perform operations according to embodiments or implementations of the present disclosure, related to the following operations.

For example, the processor 102 may control the transceiver 106 to receive information related to an index of one initial PUCCH resource set among initial PUCCH resource sets of [Table 8] through radio resource control (RRC) signaling (e.g., pucch-ResourceCommon). The processor 102 may control the transceiver 106 to receive downlink control information (DCI) including information for determining any one among a plurality of PUCCH resources included in an initial PUCCH resource set corresponding to the corresponding index.

To transmit a PUCCH based on frequency hopping, the processor 102 may determine a PUCCH resource for each of the lower hop and the upper hop based on the DCI described above. For example, the processor 102 may determine an index of the PUCCH resource based on the PUCCH resource indicator field included in the DCI, the number of CCEs through which the DCI is transmitted, and a first CCE index.

The processor 102 may determine the lowest (or highest) PRB index in each of the lower hop and the upper hop based on an index of a PUCCH resource. In addition, consecutive PRBs from the lowest (or highest) PRB index to the number of PRBs (i.e., $N_{RB}$) may be determined as the PUCCH resource.

As described above, a detailed method of determining a PUCCH resource by a UE may be based on [Proposed Method #1].

The processor 102 may control the transceiver 106 to transmit a PUCCH through the determined PUCCH resource.

As another example, the processor 102 may control the transceiver 106 to receive information related to an OCC length of a DMRS for PUCCH format 4 through an RRC signal. The processor 102 may generate the DMRS for PUCCH format 4 based on an OCC length and a CS value corresponding to the corresponding OCC length. In this case, a detailed method of generating a DMRS by the processor 102 may be based on [Proposed Method #2] and/or [Proposed Method #3].

The processor 102 may control the transceiver 106 to transmit the PUCCH format 4 and the corresponding DMRS.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Specifically, instructions and/or operations, controlled by the processor 202 of the second wireless device 100 and stored in the memory 204 of the second wireless device 200, according to an embodiment of the present disclosure will be described.

Although the following operations will be described based on a control operation of the processor 202 in terms of the processor 202, software code for performing such an operation may be stored in the memory 204. For example, in the present disclosure, the at least one memory 204 may be a computer-readable storage medium and may store instructions or programs. The instructions or programs may cause, when executed, the at least one processor operably connected to the at least one memory to perform operations according to embodiments or implementations of the present disclosure, related to the following operations.

For example, the processor 202 may control the transceiver 206 to transmit information related to an index of one initial PUCCH resource set among initial PUCCH resource sets of [Table 8] through radio resource control (RRC)

signaling (e.g., pucch-ResourceCommon). The processor 202 may control the transceiver 206 to transmit downlink control information (DCI) including information for determining any one of a plurality of PUCCH resources included in an initial PUCCH resource set corresponding to the corresponding index.

The processor 202 may control the transceiver 206 to receive a PUCCH through a PUCCH resource for each of the lower hop and the upper hop based on determination based on the aforementioned DCI. That is, the processor 202 may control the transceiver 206 to receive a PUCCH through the PUCCH resource determined based on frequency hopping. A detailed method of determining a PUCCH resource based on frequency hopping may be based on [Proposed Method #1].

As another example, the processor 202 may control the transceiver 206 to transmit information related to an OCC length of a DMRS for PUCCH format 4 through an RRC signal. The processor 202 may control the transceiver 206 to receive a DMRS generated based on the corresponding OCC length and a CS value corresponding to the corresponding OCC length and PUCCH format 4 for the corresponding DMRS. A method of generating the DMRS based on the corresponding OCC length and a CS value corresponding to the corresponding OCC length may be based on [Proposed Method #2] and/or [Proposed Method #3].

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

FIG. 20 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 20, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may enable the vehicle or the autonomous driving vehicle 100 to drive on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire information about a vehicle state, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140*d* may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the present disclosure, a specific operation described as performed by the BS may be performed by an upper node of the BS in some cases. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While the above-described method of performing a CAP and the apparatus therefor have been described based on an example applied to a 5G NR system, the method and apparatus are applicable to various wireless communication systems in addition to the 5G NR system.

The invention claimed is:

1. A method of transmitting a physical uplink control channel (PUCCH) by a user equipment (UE) in a wireless communication system, the method comprising:
receiving information related to a PUCCH resource set of the PUCCH;
determining a PUCCH resource for transmitting the PUCCH using frequency hopping based on the information; and
transmitting the PUCCH through the PUCCH resource,
wherein the PUCCH resource includes a first physical resource block (PRB) in a first hop and a second PRB in a second hop; and
wherein a first hopping distance between the first PRB and the second PRB, based on the information informing of a first PUCCH resource set, is equal to a second hoping distance between the first PRB and the second PRB based on the information informing of a second PUCCH resource set.

2. The method of claim 1, wherein the first PRB has a lowest index among a plurality of PRBs for the PUCCH in the first hop; and wherein the second PRB has a lowest index or a highest index among a plurality of PRBs for the PUCCH in the second hop.

3. The method of claim 2, wherein, in the first hop, the PUCCH resource is determined as many as PRBs for the PUCCH from the first PRB in a high frequency direction; and wherein, in the second hop, the PUCCH resource is determined as many as the PRBs from the second PRB in a high frequency direction, or the PUCCH resource is determined as many as the PRBs from the second PRB in a low frequency direction.

4. The method of claim 1, wherein an interval between a PRB with a highest index in the second hop and the second PRB based on the first PUCCH resource set is a value obtained by multiplying a PRB offset value related to the second PUCCH resource set by a number of PRBs for the PUCCH.

5. The method of claim 1, wherein the first hop is a lower hop and the second hop is an upper hop.

6. The method of claim 1, wherein total numbers of cyclic shift (CS) values corresponding to the first PUCCH resource set and the second PUCCH resource set are equal to each other.

7. A user equipment (UE) for transmitting a physical uplink control channel (PUCCH) in a wireless communication system, comprising:

at least one transceiver;

at least one processor; and at least one computer memory operatively connected to the at least one processor and configured to store instructions that when executed causes the at least one processor to perform operations including:

receiving information related to a PUCCH resource set of the PUCCH through the at least one transceiver, determining a PUCCH resource for transmitting the PUCCH using frequency hopping based on the information; and transmitting the PUCCH through the PUCCH resource through the at least one transceiver, wherein the PUCCH resource includes a first physical resource block (PRB) in a first hop and a second PRB in a second hop; and wherein a first hopping distance between the first PRB and the second PRB, based on the information informing of a first PUCCH resource set, is equal to a second hoping distance between the first PRB and the second PRB based on the information informing of a second PUCCH resource set.

8. The UE of claim 7, wherein the first PRB has a lowest index among a plurality of PRBs for the PUCCH in the first hop; and wherein the second PRB has a lowest index or a highest index among a plurality of PRBs for the PUCCH in the second hop.

9. The UE of claim 8, wherein, in the first hop, the PUCCH resource is determined as many as PRBs for the PUCCH from the first PRB in a high frequency direction; and wherein, in the second hop, the PUCCH resource is determined as many as the PRBs from the second PRB in a high frequency direction, or the PUCCH resource is determined as many as the PRBs from the second PRB in a low frequency direction.

10. The UE of claim 7, wherein an interval between a PRB with a highest index in the second hop and the second PRB based on the first PUCCH resource set is a value obtained by multiplying a PRB offset value related to the second PUCCH resource set by a number of PRBs for the PUCCH.

11. The UE of claim 7, wherein the first hop is a lower hop and the second hop is an upper hop.

12. The UE of claim 7, wherein total numbers of cyclic shift (CS) values corresponding to the first PUCCH resource set and the second PUCCH resource set are equal to each other.

13. A base station (BS) for receiving a physical uplink control channel (PUCCH) in a wireless communication system, comprising:

at least one transceiver;

at least one processor; and at least one computer memory operatively connected to the at least one processor and configured to store instructions that when executed causes the at least one processor to perform operations including:

transmitting information related to a PUCCH resource set of the PUCCH through the at least one transceiver;

receiving the PUCCH through a PUCCH resource determined using frequency hopping, based on the information through the at least one transceiver, wherein the PUCCH resource includes a first physical resource block (PRB) in a first hop and a second PRB in a second hop; and wherein a first hopping distance between the first PRB and the second PRB, based on the information informing of a first PUCCH resource set, is equal to a second hoping distance between the first PRB and the second PRB based on the information informing of a second PUCCH resource set.

* * * * *